United States Patent
Cronin et al.

(10) Patent No.: US 12,140,848 B2
(45) Date of Patent: *Nov. 12, 2024

(54) WINDOW AND ENTRYWAY SYSTEMS WITH VARIABLE LIGHT TRANSMISSION PANELS

(71) Applicant: Glass Dyenamics, Inc., Tucson, AZ (US)

(72) Inventors: John P. Cronin, Tucson, AZ (US);
Anoop Agrawal, Tucson, AZ (US);
Christopher Angelo, Tucson, AZ (US);
Clemens Hofbauer, Portland, OR (US);
Susana J. Castillo, Tucson, AZ (US);
Lori L. Adams, Tucson, AZ (US)

(73) Assignee: Glass Dyenamics, Inc., Tucson, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/048,134

(22) Filed: Oct. 20, 2022

(65) Prior Publication Data
US 2023/0066465 A1 Mar. 2, 2023

Related U.S. Application Data

(63) Continuation-in-part of application No. 17/855,922, filed on Jul. 1, 2022.
(Continued)

(51) Int. Cl.
*G02B 26/00* (2006.01)
*E06B 3/67* (2006.01)
(Continued)

(52) U.S. Cl.
CPC ............ *G02F 1/163* (2013.01); *E06B 3/6722* (2013.01); *E06B 9/24* (2013.01); *G02F 1/153* (2013.01);
(Continued)

(58) Field of Classification Search
CPC ...... G02F 1/1523; G02F 1/1533; G02F 1/155; G02F 1/0102; G02F 1/163; G09G 3/16
(Continued)

(56) References Cited

U.S. PATENT DOCUMENTS 6,141,137 A 10/2000 Byker et al.
6,661,559 B2 12/2003 Byker et al.
(Continued)

FOREIGN PATENT DOCUMENTS

| CN | 100405201 C | * | 7/2008 | ....... B32B 17/10036 |
|---|---|---|---|---|
| CN | 107624449 A | * | 1/2018 | |
| WO | WO-2019006402 A1 | * | 1/2019 | ........... G02F 1/1525 |

*Primary Examiner* — Dawayne Pinkney
(74) *Attorney, Agent, or Firm* — Rothwell, Figg, Ernst and Manbeck, P.C.

(57) ABSTRACT

The present invention relates to variable optical transmission windows and window panels (VLTP) which are used for architectural applications such as building entryway systems and windows. The optical transmission of the VLTPs is
(Continued)

reversibly changed by applying an electrical voltage. This disclosure includes combination of more than one VLTP in a single window which darken to different colors. This disclosure is directed to the use and powering of such panels in door and windows. The doors and windows having these VLTPs may also have other electronic devices which provide added user functionality.

27 Claims, 18 Drawing Sheets

Related U.S. Application Data

(60) Provisional application No. 63/217,363, filed on Jul. 1, 2021.

(51) Int. Cl.
| | | |
|---|---|---|
| E06B 9/24 | (2006.01) | |
| F21V 14/00 | (2018.01) | |
| G02F 1/15 | (2019.01) | |
| G02F 1/153 | (2006.01) | |
| G02F 1/157 | (2006.01) | |
| G02F 1/163 | (2006.01) | |
| G09G 3/19 | (2006.01) | |
| E06B 3/66 | (2006.01) | |
| H01M 50/251 | (2021.01) | |

(52) U.S. Cl.
CPC ..... *E06B 3/6612* (2013.01); *E06B 2009/2464* (2013.01); *G02F 2203/01* (2013.01); *H01M 50/251* (2021.01); *H01M 2220/10* (2013.01)

(58) Field of Classification Search
USPC .......... 359/265–275, 277, 245–247, 242; 345/49, 105; 250/70; 348/814, 817; 438/929; 349/182–186
See application file for complete search history.

(56) References Cited

U.S. PATENT DOCUMENTS

| | | | |
|---|---|---|---|
| 7,154,657 B2 | 12/2006 | Poll et al. | |
| 7,256,924 B2 | 8/2007 | Guarr et al. | |
| 7,450,291 B2 | 11/2008 | Guarr et al. | |
| 7,733,555 B2* | 6/2010 | Agrawal | B60R 1/088 |
| | | | 359/267 |
| 7,990,603 B2 | 8/2011 | Ash et al. | |
| 8,547,624 B2 | 10/2013 | Ash et al. | |
| 8,736,943 B2 | 5/2014 | Guarr et al. | |
| 8,885,242 B2 | 11/2014 | Guarr et al. | |
| 11,086,184 B1* | 8/2021 | Bergh | E06B 3/6722 |
| 2012/0159826 A1* | 6/2012 | Eichner | E06B 3/72 |
| | | | 40/779 |
| 2017/0328121 A1* | 11/2017 | Purdy | E06B 3/677 |
| 2018/0088426 A1* | 3/2018 | Posset | G02F 1/15 |
| 2019/0137797 A1* | 5/2019 | Bjergaard | G02F 1/1339 |
| 2019/0196292 A1* | 6/2019 | Brown | E06B 9/24 |
| 2020/0241375 A1* | 7/2020 | Barnum | G02F 1/163 |
| 2020/0332591 A1* | 10/2020 | Dierenbach | G09F 13/12 |

* cited by examiner

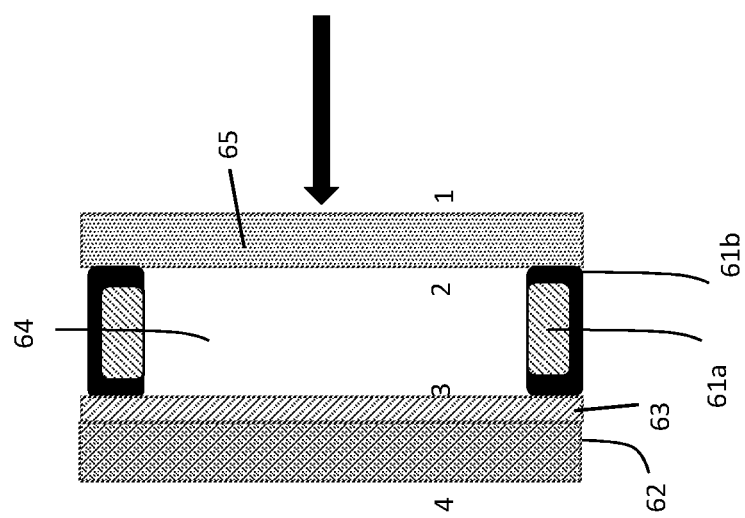

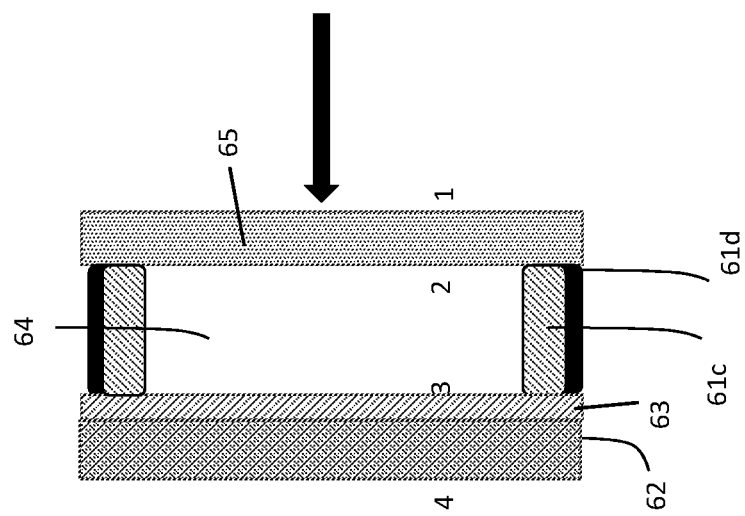

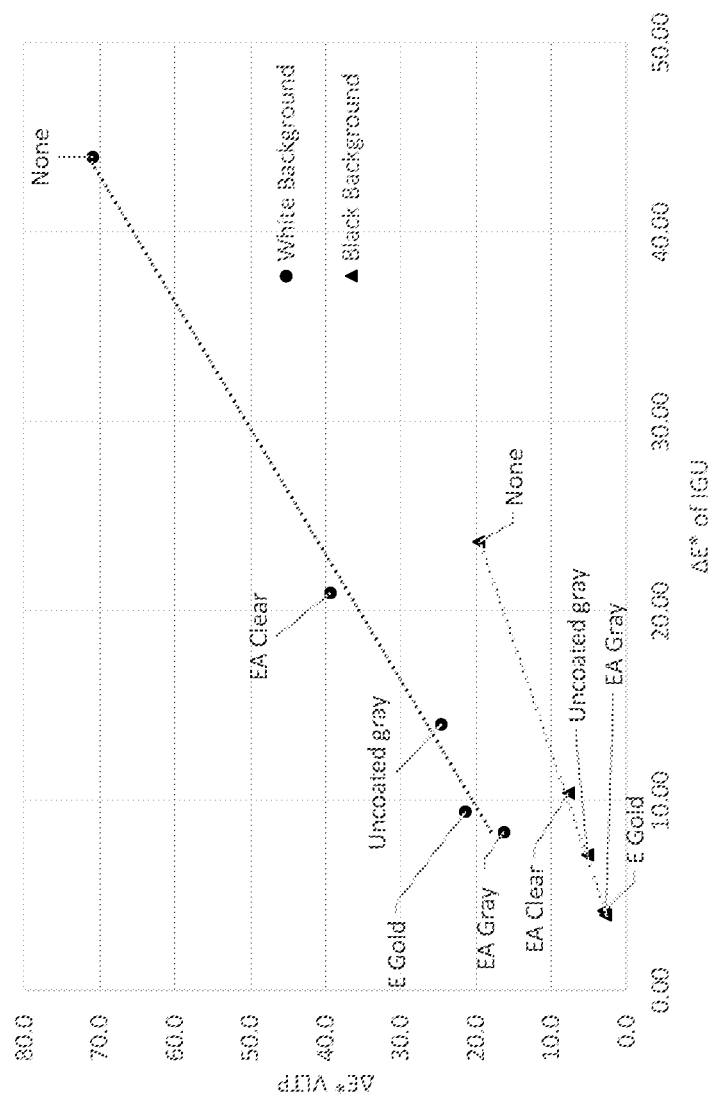

WINDOW AND ENTRYWAY SYSTEMS WITH VARIABLE LIGHT TRANSMISSION PANELS

CROSS-REFERENCE TO RELATED APPLICATIONS

This application is a continuation-in-part of U.S. application Ser. No. 17/855,922, filed Jul. 1, 2022, which claims priority benefit of U.S. provisional application No. 63/217,363, filed Jul. 1, 2021, the disclosures of which are incorporated herein by reference in their entireties.

FIELD OF THE INVENTION

The present invention relates to variable optical transmission elements which are used for windows in transportation and building doors and windows, particularly in the entryway systems of buildings.

BACKGROUND

In building applications variable light-transmission (VLT) panels are located in windows for maximizing views, privacy, glare control, light through said windows, and enhancing building energy efficiency. This disclosure is directed to the use of such panels in building entryway systems including doors. Other applications which may also be enabled by the disclosure here are windows that, in part, physically open by manual or automatic sliding, tilting, pushing or rotating about the hinges, unless specifically mentioned otherwise. The principles taught in this application also apply to the windows for transportation such as cars, buses, trains, boats and planes. Variable light transmission panel (VLTP) have been used in some building windows, but their use in the entryway systems is not known, and in part it may be the integration of such panels in a variety of formats, sizes and ease of replacement, and also its function as a combination of utility and decorative aspects have been overlooked. Typically, these VLTPs (or optically variable panels) have large areas in excess of about 100 sq cm and some are as large as 16,000 sq cm and larger. Further, the light transmission of VLTPs is reversibly changed by applying an electrical stimulus. The change in the light transmission in the panel occurs by at least one of an electrochemical process or alignment of molecules and/or particles in the electrical field.

SUMMARY OF THE INVENTION

The use of glass in a building entryway is very important both from a functional aspect (such as energy reduction and light control) as discussed below and also imparts decorative/aesthetic aspects. This disclosure includes the use of VLTPs for such applications. The VLTPs typically use electrochromic and/or may also use liquid crystal technologies. The programmatic features are used to optimize device operating parameters based on data collected from sensors, to update user preferences/inputs, to interconnect with a building management system and to address any device characteristics that change with time or to communicate a physically broken or a malfunctioning device to the user/building management system/manufacturer. Some of the device characteristics that may change with time are, its electrical resistance, electrical charge capacity, change in electrochemical (redox) potentials, optical properties and electrical/optical response as a function of temperature. External parameters temperature, light, local weather conditions, or utility power capacity or other needs may also necessitate program changes. Thus, it is preferred to provide electrical power to these VLTPs using primary battery packs unless they are powered using the main power supply of the building or secondary battery (or rechargeable) packs may also be connected to this power source.

Once VLTPs are connected to the building main power supply, the present disclosure includes integrating these VLTPs with other user-desired electronic features and control systems within a door system. This avoids the use of primary batteries as the only source of power, as these can periodically run out of power.

For example, electronic door locks typically require electricity from a battery. When these batteries run out of power, a user can be locked out of a building. In addition, replacing or charging batteries is inconvenient and time consuming, such as misplacing the battery chargers when using secondary batteries.

Thus, utilizing the electrical wiring of these VLTPs to connect and power one or more electronic devices located within a door system decreases reliance on batteries only for the electronic devices and enables use of additional devices in the door systems and reduces dependence on the limited capacity of batteries.

In one aspect, the present disclosure includes a building entryway system containing a variable light transmission panel (VLTP), wherein the VLTP is used in at least one of a doorlite, a sidelite, and a transom of the building entryway system, and wherein the VLTP changes optical transmission and color when an electric voltage is applied thereto, wherein the VLTP has a bleached state and a colored state, and wherein the transmitted color difference between the bleached state and the colored state should be large, that is equal to or greater than 35 and in another embodiment greater than 50. As explained later the color difference is measured by comparing the color in the two states and determining this difference as $\Delta E^*$.

In one aspect, the present disclosure includes a window of a building entryway system, the window comprising an electronic module and a VLTP that forms a partition between a first space located outside a building and a second space located inside the building, wherein the first space has an illumination level of $L_1$ in lux and the second space has an illumination level of $L_2$ in lux, and wherein the window is configured such that a privacy, P, of the first space through the VLTP from the second space is controlled by adjusting the visible transmission of the VLTP. This VLTP may be one of the panels in an IGU.

In another aspect the doors and windows of this invention may be configured with multiple VLTPs arranged in parallel for a given window so that the user has an option to color any one of these or all of these multiple VLTPs simultaneously. This enables the user to select color and optical characteristics such as depth of coloration with a greater freedom especially when each of these panels in an assembly darkens to a different color. The use of a combination of panels in a largely parallel configuration, each of which darkens to a different color, results in a higher degree of privacy as their color absorption peaks may be complimentary (i.e., in different wavelength regions). As an example, when two panels are combined which transmit in different colors in the darkened state, this means that each of the panels transmits at different optical wavelengths, and thus the transmitted optical wavelengths from one are more effectively blocked out by the second one resulting in superior privacy. This combination may be in an IGU where two panels separated by an air/gas gap are combined, or they are stacked on top of each other, or they are laminated together. These combination cells can reach transmissions lower than about 0.01% (contrast of 10,000), and in another embodiment at or lower than 0.001% (contrast of 100,000). Contrast may be measured as photopic or 550 nm transmission both in the bleached and the colored state and then calculating the ratio of bleach state transmission: colored state transmission. In an extension of this embodiment a third transparent glass panel with a low-e coating is introduced within the IGU that is formed by two VLTPs.

Yet in another aspect, the VLTPs are laminated to an additional transparent substrate using a polymeric film providing certain optical characteristics. These optical characteristics are imparted by at least one of tint of this additional transparent substrate, coating or coating stacks on the additional transparent substrate, and the tint of the polymeric film used. When the reflected properties of the laminated VLTPs are measured from the side where the additional substrate is located, there is at least a 50% reduction in the color difference perceived between the colored and bleached optical states of the VLTP. This reduction is in comparison to a VLTP in its two optical states that is not laminated or laminated to a clear glass (e.g., to a 2: 3 mm thick standard soda-lime glass) and using a clear non-tinted film. The colored state refers to the darkest state of the VLTP which it would color to in the intended application.

Yet in another aspect the VLTP panel that is the outside element in an IGU is a laminated structure. This VLTP is laminated to an additional transparent substrate using a polymeric film and providing certain optical characteristics. These optical characteristics are imparted by at least one of tint of the additional transparent substrate, coating or coating stacks on the additional substrate, or a tint in the polymeric film. An IGU formed using such laminated VLTPs reduces the color difference perceived in reflection from outside by at least 50% between the colored and bleached optical states of the VLTP. This reduction is in comparison to an IGU having a VLTP that is not laminated or laminated to a clear glass (e.g., to a standard 2.3 mm thick soda-lime glass) and using a clear non-tinted film. The colored state refers to the darkest state of the VLTP which it would color to in the intended application.

In one aspect, the present disclosure includes VLTP in a building entryway system, wherein the building entryway system comprises a frame and a movable element in which the VLTP is located, wherein the movable element is pivotable between a closed position and an open position, wherein electric voltage is connected to the VLTP when the movable element is in the closed position and electric voltage is disconnected from the VLTP when the movable element is in the open position.

Other features and characteristics of the subject matter of this disclosure, as well as the methods of operation, functions of related elements of structure and the combination of parts, and economies of manufacture, will become more apparent upon consideration of the following description and the appended claims, all of which form a part of this specification.

BRIEF DESCRIPTION OF THE DRAWINGS

FIG. 6a: Shows a schematic drawing of an insulated glazing unit (IGU).

FIG. 6b: Shows a schematic drawing of an insulated glazing unit (IGU).

FIG. 17 shows color change in reflection for various VLTPs when the VLTPs are in colored and the bleached states, and are plotted against the color changes when these VLTPs are integrated in an IGU; measurements are both against white and black background.

DETAILED DESCRIPTION

While aspects of the subject matter of the present disclosure may be embodied in a variety of forms, the following description is merely intended to disclose some of these forms as specific examples of the subject matter encompassed by the present disclosure. Accordingly, the subject matter of this disclosure is not intended to be limited to the forms or embodiments so described.

Figure 1:
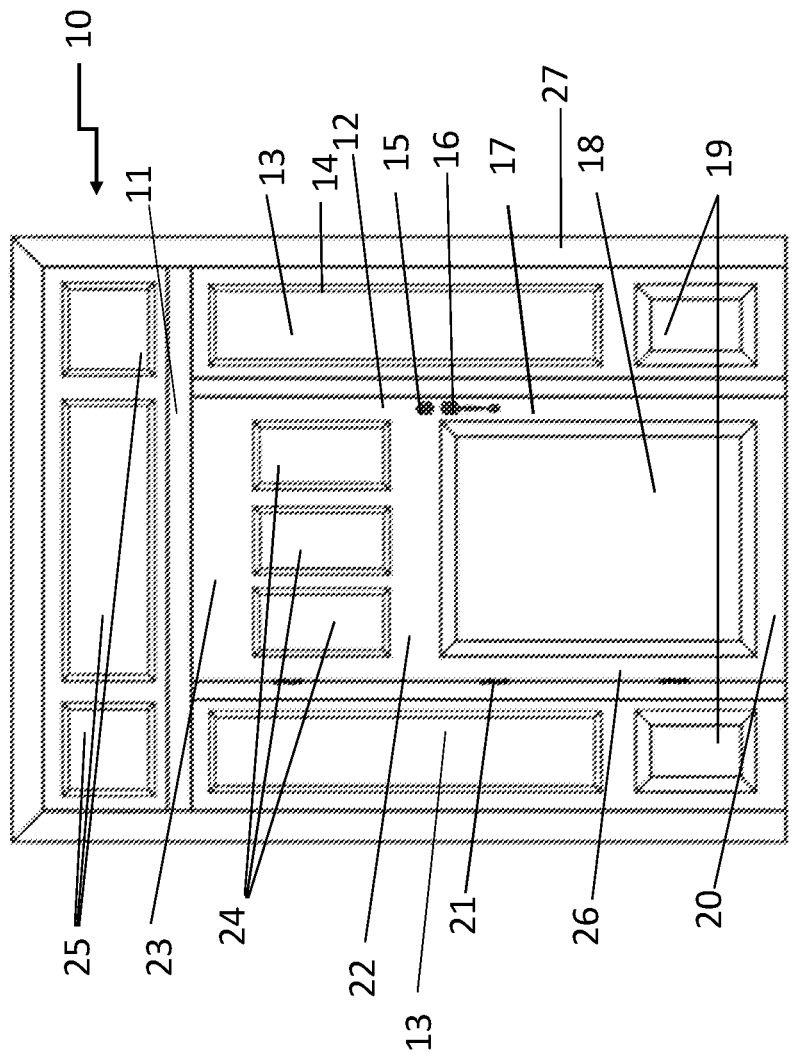
FIG. 1: Shows an anatomy of a front entry system, for example, in a residential setting.

FIG. 1 illustrates a general entryway system (or entrance system) which includes a door and several optional panels surrounding the door. The illustrated elements are as follows:

10 Entry way system
11 Mull cover
12 Shutting door stile (or door-lock stile)
13 Sidelites
14 Sidelite frame
15 Door Lock
16 Door handle
17 Door
18 Door Panel
19 Side Panels
20 Bottom door rail
21 Door hinge
22 Middle door rail
23 Upper door rail 24 Doorlites
25 Transoms
26 Hanging stile
27 Door Frame The door system shows a door which has three glass doorlites 24 and a door panel 18. The terms doorlite, sidelite and transom in the entryway system refers to glass constructions or glass panels, whereas the term door panel in the entryway system represents non-glass panels (e.g., wood, metal, etc.) FIG. 1 also shows hinges, a lock and a doorknob. On the left and right side of the door are sidelites 13 of glass and below the sidelites are side panels 19. The transoms 25 are also made of glass are shown at the top. While three transoms are shown, zero, one, two, or more than three transoms are also part of this disclosure. The side panels 19 and the door panel 18 may also be converted into one or more sidelites and/or doorlites when they are made of glass. There may be many variations to the door systems and thus the presence and number of transoms, doorlites, sidelites, side panels, hinges, locks, handles, and other components may be varied. For example, there may be no sidelites and only a transom. The door may have a doorlite 24 that extends nearly the entire length of the door area supported by the upper rail (23), bottom rail (20) and the two stiles (12 and 26) on the side. Thus, the middle rail 22 is also optional. The panel 18 in the door 17 may be replaced by glass. The doorlites 24 may be separate pieces of glass or the door 17 may include only one single doorlite and it may have a partitioned look by placing dividers within the single glass doorlite. Similarly, the sidelites 13 may be divided in several parts and may extend the entire door length. In some aspects, the side panels 19 below the sidelites 13 may also be replaced by glass as small sidelites. Similarly, the Transom 25 may be in three sections as shown or in one or two sections or even divided into more sections (or may be absent). The door system may only have one or more sidelites and no transoms, etc.

The present disclosure uses glass panels with variable light transmission in at least one of the elements in the entryway system such as doorlites, sidelites and transoms. These are particularly useful in residential applications. There may be several considerations in selecting glass panels for the door system other than the fact that natural light is desired and one can see through them to feel a part of the outdoors, the others relate to decorative function (aesthetics) for example color and opacity, privacy function and energy efficiency function, light control, and/or several of these functions combined. The entryway system also includes the electronics and connections to power and control the color and transmission of the VLTPs (in doorlites, sidelites and transoms) and any associated electronic devices connected to the system as discussed below.

Typically, the energy efficiency of opaque building envelopes (walls, roofs/ceilings, doors, windows, etc.) is measured by R value, where R is the resistance of heat from one side (e.g., outside or inside) to the other (e.g., inside or outside) respectively. The lower value of R signifies low efficiency as heat can be easily conducted from one side to the other. The imperial units of R are (° F.-ft$^2$-hour)/Btu and the metric units are (° K m$^2$)/W. By multiplying the R value in imperial units by 0.176 one obtains the R value in metric units. Unless mentioned specifically, the units of R in this disclosure shall be in imperial units.

The R-value of a 1¾-inch wood door is 3.03. R-values increase with increasing thickness of the material. A 2¼-inch solid-core wooden door, for example, has an R-value of 3.70. For comparison with other materials, a 2-inch-thick metal door with a core composed of urethane foam insulation can have an R-value of 15. In most cases, insulated steel or fiberglass will have an R-value in a range of 5 to 7. As a comparison, a 6 mm thick glass (about ¼ inch) has a R value of 0.91. A double pane window with 12.5 mm gap filled with air has an R value of about 2.1, and if a low-e coating is incorporated on one of the substrates within the gap, the R value increases to about 3.

The window having a VLTP in the door may comprise an insulated glass unit (IGU), i.e., one of the panels of this IGU is a VLTP. An IGU is formed using two or three panels in parallel which are combined with a gap in the range of about 3 to 20 mm. FIG. 6a shows a schematic of an IGU which uses two glass panels. This IGU shows two glass panels 62 and 65 which are bonded at the perimeter using a spacer 61a and a sealant 61b. The spacer primarily dictates the width of the gap 64 which is filled with a gas. The gas is typically air, argon, krypton, or their mixtures, etc. The thick arrow shows the direction of the solar light entering the window, and the four surfaces of the IGU which contact air or gas are labelled as 1, 2, 3 and 4 starting from the outside. Panel 62 also shows an optional Low-e coating 63 (please note that the Low-e coating is optional which is located on surface 3, but desirable in most window systems for increased energy efficiency). In some aspects, the low-e coating may also be on surface 2 or on surface 4, depending on the climatic conditions and compatibility with the process utilized to form these panels and deposition of these coatings. FIG. 6b shows a related IGU construction, and the same numbering system is used for most of the components as in 6a. The difference here is the edge sealant in forming the IGU. Here the spacer element is shown as 61c and the sealant 61d. The spacer element (also referred to as a super-spacer) has its own adhesive (not shown), and the sealant 61d which for example may be a silicone or polyurethane material. In some cases, a capillary tube (not shown) may be included in the construction, which is a breathing tube between the air gap 64 and the outside ambient air. In some cases, the gap may be evacuated, and in that case this gap is about 0.1 to 3 mm and it is supported by spacers or pillars throughout the panel area so that the normal air pressure outside of the IGU does not collapse this gap called vacuum insulated glazing. IGU panels have higher thermal and solar efficiency as compared to the single panel constructions. For the applications contemplated herein, the IGU construction will have one of the panels being a VLT panel. In some aspects, panel 65 is a VLTP. Further, it is highly desirable that as shown in FIG. 6a or 6b, at least one of the surfaces selected from 2, 3 or 4 of the panels comprising the IGU panel has a coating or adhesively bonded film with low-emissivity (low-e) properties. The emissivity of the bonded film is typically less than about 0.2, and in other embodiments less than about 0.1. For low-e emissivity coatings on glass, the emissivity number is less than 0.1 and other embodiments less than 0.05. The VLTPs may be made using heat strengthened glass, tempered glass, or may be laminated using a pair of laminating films on either side of the VLTPs between a pair of transparent glass or plastic substrates to enhance strength to meet building code safety standards or ANSI Z97.1 impact standards. One of the glass panels within the window system (i.e., one of the panels in an insulated glass unit (IGU) or one of the panels used to fabricate the VLTP) may be completely transparent or frosted to any desired degree. In an alternative method, polymeric films may be bonded to the exterior surfaces of the VLTPs to enhance their strength to promote safety or contain broken pieces of glass, in case the panels break (for example polymeric films, e.g., 3M SH4CLARXL (safety and security 40) is available from 3M (St. Paul, MN). These panels may have various external reflected colors and/or internal transmitted colors. Said colors can be individually customized. Use of several VLTPs in an IGU for additional color and transmission control is discussed below. In some aspects, while not shown in FIG. 6a or FIG. 6b, a thin glass element (for example having a thickness less than or equal to 1.6 mm, and in some embodiments thickness less than or equal to 1.1 mm) is inserted within the gap 64 (the gas spaces on both sides of this thin element may not be sealed from each other for pressure equalization, but sealed from outside air. This thin element may have an optional low-e coating thereon which may be either in addition to the low-e coating 63 shown in FIGS. 6a and 6b, or it may be the only low-e coating in the IGU.

Thus, on one hand, it is preferred that when the focus is on energy savings, the IGUs used in the entryway systems with VLTPs should have a minimum R value of 3. Since, 1 ¾ inch thick wooden doors are common, R value of IGU's in an entryway system should preferably be equal to or greater than 3 to ensure that energy efficiency of the building is not compromised by the use of VLTPs in the entryway systems. This means the use of these energy efficient VLTPs in doorlites, sidelites and in transoms. In these IGU's at least one of the panels is a variable transmission panel (which may be further laminated for safety and/or UV protection), which to form an IGU is assembled with second pane separated by a gap. The second pane is either tempered or laminated for enhanced safety. One may also use two VLTPs separated by a gap to form an IGU, where each of them is controlled independently to get a large optical modulation range. Usually, the R values stated above are measured in the center of the glass.

Another aspect of use of VLTPs in the entryway systems, particularly for residential applications is to enhance the decorative and light control value. In many instances colored glass is used in all or part of the entryway system (e.g., as a pattern) to enhance the visual appeal. The addition of VLTPs allows one to change the appearance of the entryway. The VLTPs may be only used in all or part of the total glass panels used in the entryway. These VLTPs may be controlled separately to provide a different look as desired by the user. For this case, the VLTP used in the building must show a large visual change in its bleached (non-colored state) and the colored state. This visual change may be quantitively measured by the transmitted light. Further, the VLTPs may be programmed to automatically cycle between a colored and bleached mode to constantly change the color pattern in the entry way system to signal or to celebrate an event. In some instances, patterns may be put in each of the VLTPs so that only those change color. This is done by pixelating the transparent conductor, and addressing these pixels individually or as a set for creating patterns or text.

Color (or appearance) of the VLTP (or a window having a VLTP) is established by measuring transmitted light using color coordinates. VLTPs may also be laminated using colored polymeric films or glass with different colors or reflective coatings for color customization and privacy, as discussed later. There are several color coordinate systems used to measure color which are mathematically related. A commonly used three-coordinate system called "L* a* b*" (also referred to as CIELAB) will be used to explain this, which represents all color variations enclosed within a sphere as explained below. Here L* represents the darkness of the object where the L* value has a range from 0 to 100. The coordinates a* and b* represent four colors on two coordinates. A zero value of a* means neutral color in terms of neither being red or green. An increasing a* value which is positive shows increasing red color, an increasing absolute a* value which is negative shows increasing green color (as an example a* value of −40 is more intense green as compared to an object with an a* value of −20). Similarly, a zero value of b* means neutral color in terms of yellow and blue. An increasing b* value which is positive shows yellow color and an absolute increasing b* value which is negative results an increasing blue color. When an object has a particular a* and b* value, then it shows that it is a certain mix of the four colors described above (a combination of chroma and hue). When both a* and b* values are zero then the object is not colored, but may still appear light (whitish) or dark (greyish) depending on the L* value. Sometimes a* and b* values are combined by using c* in a relationship where $c^* = (\sqrt{(a^*)^2 + (b^*)^2})$. Thus, a smaller value of c* shows that the primary colors are less intense (or less chroma), but does not tell us what the primary colors or the hue looks like. A smaller c* value means more color neutrality, and for achieving neutral color a smaller value of c* is desirable. For neutral colors in one embodiment c* is equal to or less than 15 is desirable, and in another embodiment, c* should be equal to or less than 10, and yet in another embodiment this should be equal to or less than 6. For EC cells (or windows and IGUs having one or more EC cells) which offer neutral color, these c* values should be within these bounds for both the bleached and the colored states. For those windows with EC devices where the coloration depth can be varied, typically for the claims of this invention the color of a VLTP is measured in its bleached (non-colored) state and in the darkest or the least transmitting state to which it is darkened to in the intended application.

For the total color appearance of an object, L* value must be factored in because even if the two objects may have the same a* and b* values, but if their L* values are different they will be perceived very differently by human eye. For example, in one case the object may look faded (high L* value) while in another case it may be more saturated in color (L* value closer to 50) or much darker (lower L* value). Therefore, the color difference ΔE* (i.e. the total color difference) considers changes in a*, b* and L*. The ΔE* between two different optical states of a VLTP is established by measuring the transmitted color (or the reflected color as the case may be) in each state and expressing the color in all three coordinates that is in "L* a* b*" system, and calculating ΔE* as given below. For EC devices the coordinates of the light being transmitted are measured when the EC device is in the bleached state ($L_{1*}$, $a_1^*$ and $b_1^*$ and again when it is in the colored state ($L_{2*}$, $a_2^*$ and $b_2^*$). Using this color system of coordinates, the difference in the color between the two optical states ΔE* is computed as given below in Equation 1.

$$\Delta E^* = \text{Sqrt}\{(L_2^* - L_1^*)^2 + (a_2^* - a_1^*)^2 + (b_2^* - b_1^*)^2\} \quad \text{(Equation 1)}$$

In order to have a large change in color in transmission when an EC cell is colored from its bleached state, the transmitted color difference ΔE* should be large that is greater than 35 in one embodiment, and greater than 50 in another embodiment. This may be measured on the VLTP alone or an insulated glass unit containing a VLTP as described below, that is in whatever form the product is used in the window or the entryway system. Those panels containing liquid crystal materials which only change from a clear to an opaque state upon the application of electrical power do not show a color difference of 35 in the two states.

This may be seen or inferred by following the discussion below regarding frosted glass and in Example, where the use of a frosted glass panel in an IGU with EC glass did not result in any appreciable color or color difference as compared to the color or color difference with an IGU which used clear glass with the same EC cell.

Frosted glass may also be used as one of the substrates in making the VLTP and/or in an IGU may be fabricated with frosted glass as a second pane. Use of frosted glass can add privacy (although see through view is compromised), in addition to the decorative function and enhanced energy efficiency as discussed below. The frosted glass generally has an optical haze greater than about 30%. In aspects where the VLTP exhibits many colors or shades depending on the magnitude of the voltage/power applied, then at least in one of the colored states, the above color difference will hold as compared to the bleached state. When frosted glass is used as a second pane, the frosted side of the glass can face inside the building and the other side facing the IGU gap may have a low-e coating so that it also provides the benefit of increased energy efficiency.

Although it is desirable that in VLT windows, there is a large change in $\Delta E^*$ in transmission, but in many instances, it is also desirable that this change must not be easily seen from outside of the building or a vehicle, etc. For example, if color is easily discernable during the day from outside and different windows are in different states of coloration, then it gives rise to a checkerboard effect, and reduces the aesthetics under the following conditions. This happens when there are several windows which could be seen simultaneously and the VLTPs of these are in different optical states. The color from outside during the day is related to reflected color rather than the transmitted color. For example, this issue has been addressed in U.S. Pat. No. 11,287,717 by incorporating reflective stacks and/or using tinted substrates for the fabrication of the VLTP (or the EC device); the teachings of which are incorporated herein by reference. PCT patent application WO200003290 also aims to decrease the outside reflectivity by incorporation of an interference control layer within an EC device.

U.S. Pat. No. 9,091,896 addresses this issue by claiming a certain reflected color constraints by laminating an additional glass which is coated with a single reflection control layer onto an external surface of an EC device. This lamination is done using a polymeric film (e.g., polyvinylbutyral or a polyurethane film) so that the reflective control film is in contact with the polymeric film as is the EC device. Although, this claims the reflected color at different angles to have c* value of less than 10, it does not provide any insight on what was the reflected color of the underlying EC device and how much reduction in color was achieved by laminating the device to the glass with reflection control layer. It is also not known or predictable what the results would have been if the EC device was laminated with an additional plain non-coated glass. Further, the patent does not address how this reflection may be controlled using this additional glass that was tinted. It is also not clear, how the reflection was measured (using a white or a black background to arrive at the above analysis).

As explained below, c* value is not sufficient so as not to show the color differences, but that it should be based on total color difference that is $\Delta E^*$. In addition, the present disclosure also includes lamination of glass which has several coated layers to enhance reflection. The coated side contacts the laminating polymeric material. Any number of coatings may be used, however, typically the total number of layers in the coatings (including underlayer(s)) to enhance reflection are between 3 and 5. Also, the last coating (meaning the layer that will touch the polymeric layer during lamination) has a refractive index of 2 or greater and in another embodiment 2.5 or greater. The underlying layers (or the undercoats) have at least one layer which has a refractive index of less than 2.

Figure 15:
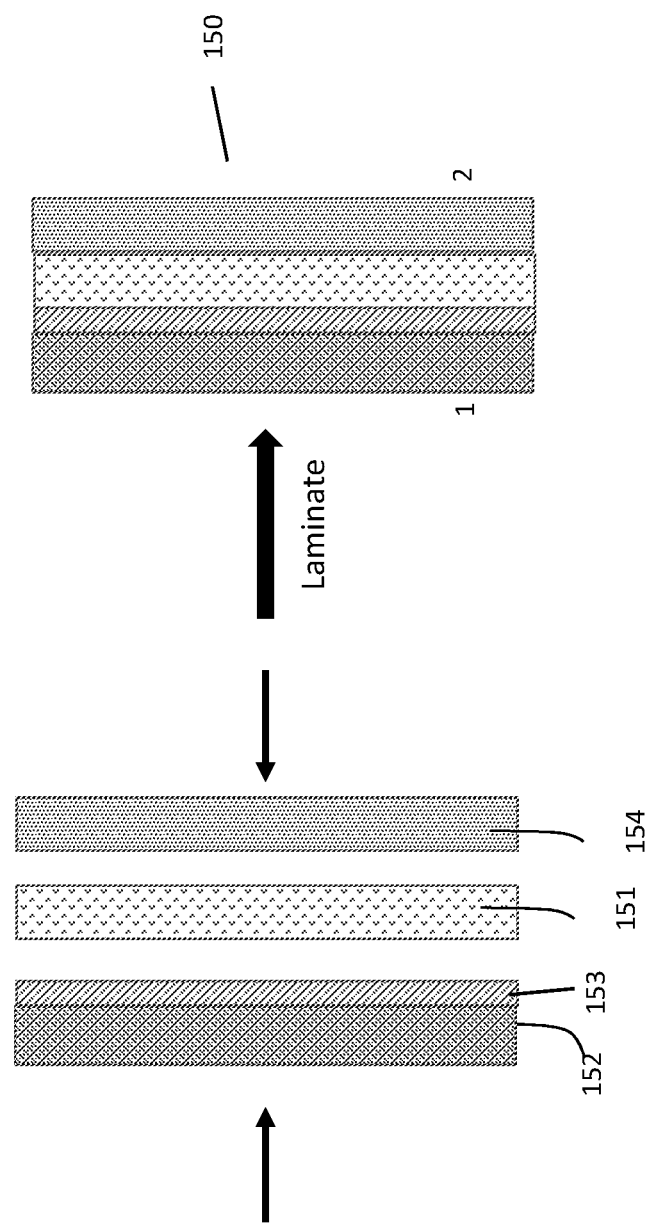
FIG. 15 shows a VLTP laminated to a cover glass.

FIG. 15 shows this concept where a VLTP 154 is laminated to another clear substrate 152 using a polymeric film 151. The substrate may be coated with optional one or more layers shown as 153. These coatings may add color or used for reflection control or both. The substrate and/or the film may be tinted. As discussed below, a pattern may also be introduced through the film or by printing on the substrate 152 (these are not shown). This printing is usually done on the side where the coating is shown and may even be printed onto the coating. The laminated VLTP is shown as 150. Its two sides are labelled as 1 and 2. When the laminated VLTP is used to make an IGU (e.g., as shown in FIG. 6a or 6b), then this panel is substituted for 65 in FIGS. 6a and 6b. Its placement is such that the sides shown as 1 and 2 in FIG. 15 will also be sides 1 and 2 as shown in FIGS. 6a and 6b.

In the present disclosure, surprisingly, a clearer understanding of reflection control was achieved by laminating specific kinds of commercial glasses which were tinted and/or had colored or clear reflective stacks (rather than single coatings). In addition, this provides superior control and manipulation of the reflected colors. In one embodiment the present disclosure reduces the reflected color from a VLTP by externally laminating with the additional transparent substrate such as glass using polymeric films (e.g., thermoplastic films of polyvinylbutyral or a polyurethane). Reflection may be measured by placing a white or a black background behind the VLTP or the laminated VLTP, or even when this is in an IGU configuration window. White and black backgrounds provide different reflectivity results, where the former may mimic a whitish drape behind the VLTP or the window (or even objects located inside the building but close to the window), whereas a black background may be use of black drape or no drape behind the window but a large deeper building space. Thus in one embodiment the aim is to reduce the reflected color from a non-laminated VLTP or a VLTP laminated using clear glass (and using a clear polymeric film). $\Delta E^*$ is a better measure of color difference as compared to c*. As an example, a product having a* and b* both at −7 and a different product having a* and b* as both being +7, would both have c* value of 9.9 (just under 10). Even though the first product is a mixture of blue and green and the second one of red and yellow. On the $\Delta E^*$, even if one were to assume that L values are the same for both products, this parameter would be 19.8. Since there are always differences in L* values (due to the depth of coloration), even modest differences in L* causes the $\Delta E^*$ values to be much larger. In addition, c* value is obtained for one state (e.g., colored or bleached state) only, that is, it is not a comparison between the two states as is $\Delta E^*$.

Thus, the present disclosure includes a significant reduction in $\Delta E^*$ by at least 50% after lamination when the reflectivity of a VLTP is measured prior to lamination versus after lamination. This reflectivity is measured when the VLTP is fully colored (as intended in the application) and when this is fully bleached, and the color difference $\Delta E^*$ is compared between the two states. In one embodiment the optical properties of the glass being laminated and/or the polymeric film being used is such so that a color difference reduction by at least 50% is obtained. In one embodiment this measurement is made with a white background and in another embodiment with a black background. Color difference in the reflection is measured when the VLTP is in the bleached (non-colored) state and the deepest colored state that would be used in the product and then measuring L*, a* and b* color coordinates for each state and then estimating the color difference by calculating $\Delta E^*$. In another embodiment, as a comparison, when these VLTPs are integrated in an IGU without lamination as described above, then the change in color for the IGU in reflection is larger than 30 against a white background. Against the black background without lamination, the change in color is also larger than 20. After the lamination of VLTP when it is introduced in the IGU using certain types of glasses and/or polymeric films, these reflective color changes should be reduced to less than 25 (or less than 20 in another embodiment) against a white background; and a large reduction is also obtained against a black background of less than 10 (or in another embodiment of less than 8). It should be noted that different measures are used for indicating a large color change for white and the black backgrounds.

Since a significant use of these VLTPs in exterior building windows is in an IGU configuration, the reflected color should be measured from the outside in this configuration, that is after incorporating a VLTP in an IGU. As discussed above this VLTP is laminated to a glass with specific properties and/or using polymeric film with specific properties. The difference in $\Delta E^*$ when measured for an IGU when the VLTP is fully colored (as intended in the application) and when fully bleached should be less than 20 when measured using white background, and in another embodiment less than 15. When the same is measured using black background, $\Delta E^*$ should be less than 10, and in another embodiment less than 8. These measures minimize the checkerboard effect when several windows are viewed externally during the daytime, and each of them may be in a different optical state of coloration.

Lamination also means that either a VLTP after fabrication is laminated to the additional glass with specific properties, or one may fabricate a VLTP using a laminated glass as one of the substrates where the glass laminated to the transparent coated substrate has the desired reflective and/or tint properties, or that the film has desirable tint properties. Depending on the color and the depth of coloration of the VLTP, the desirable optical properties of the additional glass and the film may be different, The important issue is to make their selection so that intended reduction in $\Delta E^*$ is obtained as discussed above.

Use of multiple VLTPs in a single window where the VLTPs are assembled in a parallel configuration so that the light passes through multiple VLTPs can provide additional benefits. One benefit is that even if they have similar optical properties (i.e., color or spectral properties in colored and bleached states are similar), they will result in a higher level of darkening and hence provide higher degree of darkening control, and in the darkest state more privacy. Another interesting variation may be where these panels color to different colors. This combination is discussed below.

In one aspect, two VLTPs are combined in a parallel configuration (as used herein, "parallel" includes angles between the panels being less than 10 degrees, e.g., 0, 1, 2, 3, 4, 5, 6, 7, 8, 9, or 10 degrees or any angle between 0 and 10 degrees) where each of them darkens to a different color. This means that when each of them colors individually to the darkest state that they would color to in the intended application, the color difference between them is at least 25 as measured by transmitted light. This means that in the darkest colored state, their color properties in transmission are measured, i.e., their L*, a* and b* are established. The color difference between the two VLTPs, $\Delta E^*$, is calculated in this state. This color difference should be equal to or greater than 25. For calculating this color difference, not only the chroma and hue values (i.e., a* and b*) are used, but also the darkness or L* is used. This is because a color difference is perceived by the eye even if a* and b* are similar for the two panels, but L* are different. Thus, there is one more measure of color difference which needs to be added to ensure that the two panels are truly darkening (or coloring) to different colors. This additional measure is selected from at least one of the following:

a. As explained above a* and b* represent color hue; that is positive polarity of b* (means when b* is positive) is yellow and represents increasing yellowness with increasing positive value of b*. Similarly negative polarity of b* (i.e., when b* is negative) shows a blue hue which increases in blueness with values of b* becoming more negative. Similarly positive polarity of a* shows that the object has a red hue which increases with increasing value of a*. Negative polarity of a* represents green color which increases in greenish intensity as the value of a* becomes more negative. Thus, if one of the panels in the colored state has a certain value of a* and b*, then the second panel must have one of either a* or b* of a different polarity. As an example, if a panel in the colored (darkened) state has in transmission a* and b* as positive values, then the second panel should have negative value for at least one of either a* or b*.
 b. The second criterion is that in the darkened state (i.e., in the colored state), either the a* or the b* of the two panels in transmission must differ by at least 20.

The advantage in this type of combination is that when the panels darkened individually to different colors there is more latitude in tailoring the appearance of the window system by coloring one panel at a time, and when both of the panels darken simultaneously that results in a neutral or a third color very distinctive from the previous two. This is similar in terms of novelty such as smart LED (light emitting diode) lamps where the user can select a color to suit an occasion, but in this case the window color is changed to achieve this. As an example, such a lamp-Philips *Hue White and Color Ambiance A*19 60 *W* Equivalent LED Smart Bulb—may be purchased from Amazon Inc. When combining several VLTPs that darken to different colors, the color selection may provide a useful attribute during the daytime where the user can control the color ambience of the lighting inside the building using sun as the light source.

In one aspect, a window has two panels arranged in parallel in an IGU configuration, wherein each of the panels in an IGU has variable transmission properties (e.g., panels 65 and 62 in FIG. 6*b*). For example, panel 65 may color to a blue color and panel 62 to a green color or a red color, or a neutral color. Another way of a parallel combination is where a monolith is made using two or more VLTPs and then it is substituted for 65 (FIG. 6*b*) in an IGU with a low-e coated substrate 62 to form a window with these coloring attributes. A third aspect is where the monolith with multiple EC cells is used by itself in a window without being a part of an IGU.

Yet another advantage of combining panels which color to different colors is the ability to get high visible transmission in bleached state (when all VLTPs are bleached) and extreme darkening in the visible region when in the colored state (when all VLTPs colored). Visible region being defined between 400 and 700 nm. The high visible transmission in one embodiment means that when the different coloring cells are combined then at least in the visible range of 100 nm or more the transmission is greater than 50%, in another embodiment 50% or greater transmission should be at 550 nm. Yet in another embodiment this is greater than 60%. Extreme darkening means transmissions of 0.01% or lower in a visible wavelength range of 100 nm or more, and in some cases even lower than 0.001% transmission in a range of 20 nm or larger. These transmissions are so low it is best to measure these in optical absorbance mode, as an example a transmission of 0.01% corresponds to absorbance of 4 and transmission of 0.001% corresponds to an absorbance of 5. Thus, transmissions lower than 0.001% transmission will have absorbance numbers greater than 5. It must be noted that the wavelength ranges expressed above may be contiguous or non-contiguous in the visible range.

Figure 7:
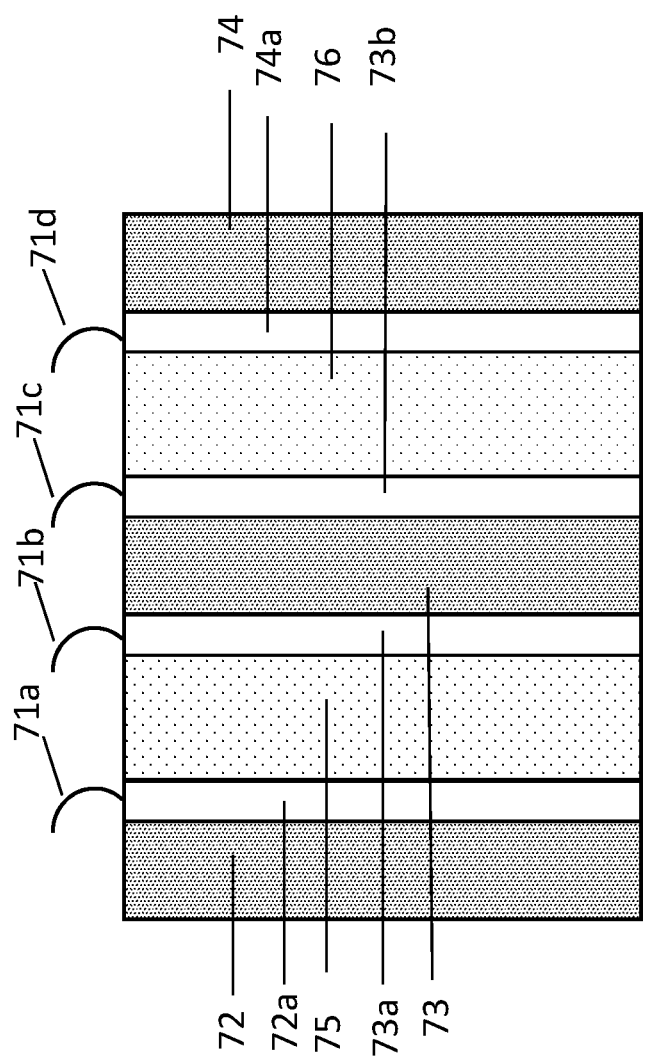
FIG. 7: Shows a monolith combination of two electrochromic devices using a common substrate.

There are several ways of making the monolith panels using multiple VLTPs. For example, U.S. Pat. No. 5,076,673 teaches combination of two EC cells in a parallel alignment, the teachings of this patent are included herein by reference. This is to obtain lower optical transmission when both of these were powered or keeping the combination colored for a long period of time by only coloring one panel at a time and coordinating their switching so that a uniform prolonged coloration could be maintained without having to only rely on a single panel to provide continuous coloration. The multiple EC cells were combined in two ways to form a monolith. FIG. 7 shows one type of combination of two EC cells where one of the substrates 73 is common to both the cells as it is coated with a transparent conductor on both of its sides. This figure shows three substrates 72, 73 and 74. Substrates 72 and 74 are coated with a transparent conductive coatings 72a and 74a. Substrate 73 is coated on both sides with transparent conductive coatings 73a and 73b. The conductive coatings typically constitute one of indium-tin oxide, fluorine-doped tin oxide and zinc-aluminum oxide. 75 and 76 are electrochromic mediums of the two EC devices contacting the respective transparent conductors (TCs). The first EC device is between TCs 72a and 73a and the second EC device is between 73b and 74a. The first EC device is powered by the leads 71a and 71b connected to the TCs 72a and 73a, and the second EC device is powered by leads 71c and 71d connected to the TCs 73b and 74a.

Figure 8:
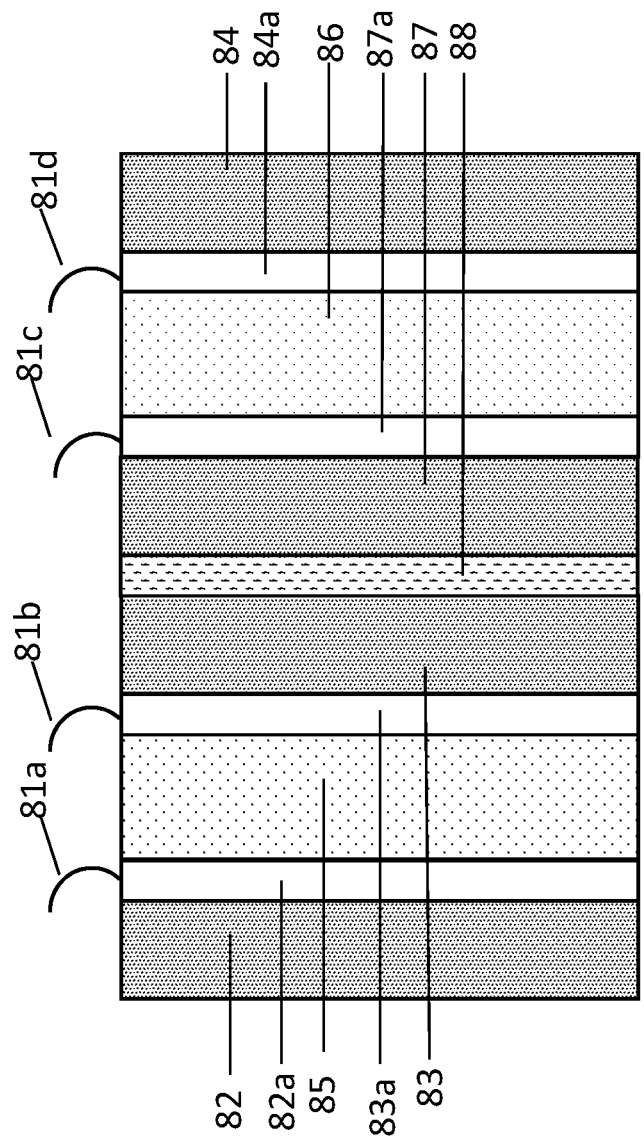
FIG. 8 shows a monolith combination of two separate EC devices using a bonding or a laminating layer.

FIG. 8 shows another way of combining two EC devices also illustrated in U.S. Pat. No. 5,076,673. Two separate EC devices are fabricated. The first one using substrates 82 and 83 and the second one using substrates 84 and 87. For the first device substrates 82 and 83 are coated with transparent conductors 82a and 83a respectively. The first device is fabricated by containing an electrochromic medium 85 between the two transparent conductors. The second device is fabricated by taking two substrates 84 and 87 and coating these respectively with transparent conductors 84a and 87a and then containing the electrochromic medium 86 between these two substrates. These two are then assembled using a laminating transparent polymeric film 88 such as polyvinyl butyral (or a polymeric interlayer). The first device is powered using the leads 81a and 81b connected to the transparent conductors 82a and 83a. The second device is powered using the leads 81c and 81d connected respectively to the transparent conductors 87a and 84a respectively. Tandem electrochromic devices are also taught in U.S. Pat. No. 10,901,284. As in the previous devices, either two independent EC devices are combined as in FIG. 8, or these are fabricated using a common central ion-blocking layer. The reasons for these combinations using similar EC devices are to obtain higher optical density (darkness or superior privacy); also when two devices are colored simultaneously the columbic charge requirements for each device are separate and they color more rapidly. Published PCT application WO 02/08826 teaches combining two EC devices within a single window that attenuate light in in visible and in NIR, however combinations providing different color attributes was not recognized. Sometimes, a mixture of more than two electrochromic materials are used in a single device, and such devices show a voltage dependent color change (e.g., see U.S. Pat. No. 6,020,987). However, the difficulty with these is that the depth of coloration and color with increasing voltage is different. Since several dyes participate in different concentrations to provide color with increasing voltage, the resultant is a mixed color which is voltage dependent rather than the ability to select specific colors and mix them independently in any proportion without having one dye impacting the other's performance. In another combination one device darkens to one color and the other device darkens to a different color in the visible region but also in NIR. Using one panel that also attenuates in the NIR region can provide superior solar energy control (as NIR radiation in the solar spectrum is almost 50%) without having to sacrifice the visibility or the color. Multiple VLTs may be configured in several ways. In the current disclosure any of these methods may be used to combine those EC devices which color to a different color (i.e., darkening in different wavelength ranges within the visible range).

Any type of multiple EC devices may be used to combine them in a parallel configuration within a single window to obtain the advantages of the color disclosed herein. These may be devices that contain dye in an electrolytic medium and contacts two substrates with transparent conductors, e.g., see U.S. Pat. No. 6,020,987, in some other devices one of these transparent conductors may also have an electrochromic coating (e.g., see U.S. Pat. No. 7,300,166); or devices may have electrochromic materials coated on the transparent conductors deposited on two substrates, wherein the electrolyte touches the electrochromic coatings (e.g., see U.S. Pat. No. 10,901,284); or these devices may be all thin film devices which are coated by depositing a sequence of layers on a single substrates but still uses electrochromic mediums located between the two transparent conductors, e.g. see U.S. Pat. No. 9,152,001. In all these EC devices for windows an electrochromic medium is enclosed or disposed between two transparent conductors.

Figure 2:
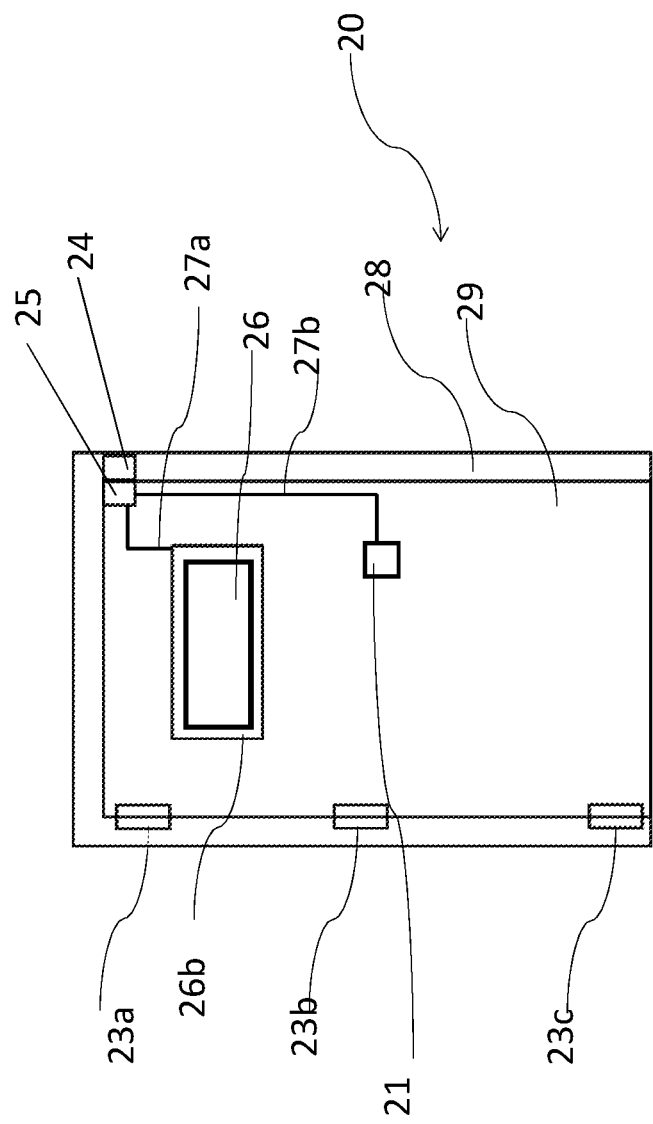
FIG. 2: Illustrates a front view of a building door system according to some embodiments.

FIG. 2 illustrates a front view of a building door 20 including a door 29, window 26, and door hinges 23a, 23b and 23c. The sidelites and the transom are not shown, however if they are present, they may also have VLTP, and be powered by the same power supply that powers the VLTPs in the door or may have a different power supply. The window containing a VLTP located in the door is shown as 26 and 26b is a bead (a frame or four sides of a frame that seamlessly fit together), which helps to hold the VLTP in place and covers its edges which may have electrical connections, sealants, etc. The window 26 in the door comprises a VLT panel (also referred to as reference 26). The VLT panel in the door is connected with an electric cable 27a which is concealed in the door going to the power supply 25 (or called VLTP power supply or an "electronic module" as this has many other functions as discussed later). The power supply 25 located in the door is connected to the input power from the mains 24 which is located in the non-movable part, the door jamb structure 28 or somewhere inside the walls, preferably in proximity to the entryway area. Also shown in this figure is an optional electronic device 21, which is connected to the power supply 25 by an optional electrical cable 27b also concealed within the door or through a notch which is later covered to make the door look homogeneous. A door system may be used in any suitable location that requires a transition between two spaces, for example to divide interior rooms, or as an exterior entry or side door to the building or other structure.

In addition, foam or other flexible gaskets are used around the perimeter of the VLTPs to protect them from shock as the doors and windows are opened and closed repeatedly against hard stops, and also to improve weatherization, that is to minimize any exchange of inside and outside air from the perimeter area of these panels and the frames they are in, to preserve high energy efficiency. It is preferred that these materials are removable or are adhesively bonded to only one of the panel or the frame in which these VLTPs are incorporated into so that these panels and/or the foams/gaskets are easy to remove for replacement if desired. The channels and/or the holes in the doors (54 and 55 respectively in FIG. 5), and window jambs (hinge or strike jambs), casings, etc. to carry the electrical wires may also be lined or insulated with thermal insulating tapes to ensure that the insulation properties of doors are not compromised due to the presence of these holes and channels. This also includes channels and holes in casings and sashes, etc., for transoms and sidelites which are used in buildings and are generally associated with the front entry-way systems.

Figure 3:
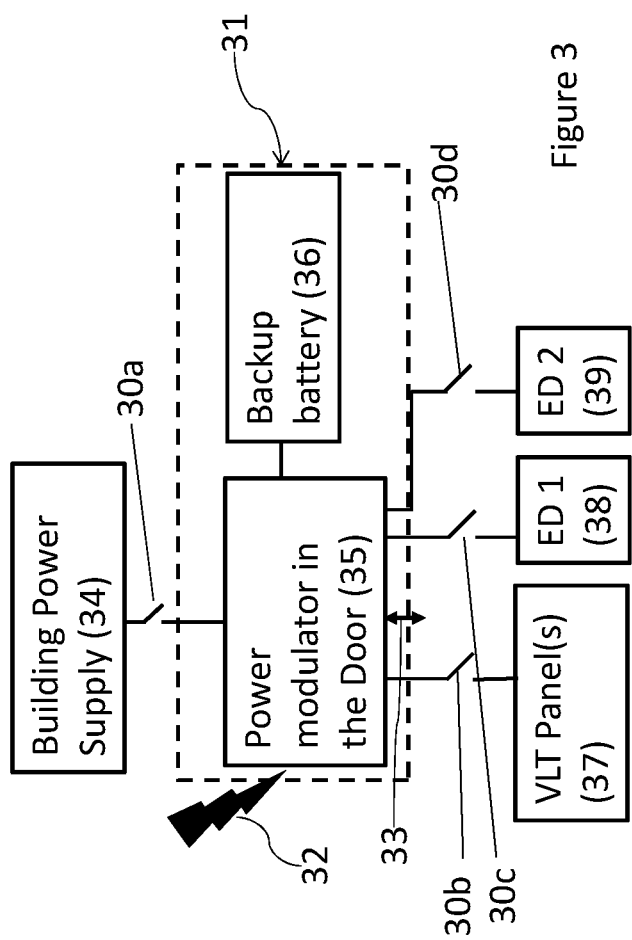
FIG. 3: Illustrates a schematic representation of a power supply/controller system integration with building power supply, VLTP and other components.

FIG. 3 shows a general schematic of the powering and control system integration. The main building power supply (34) connects to the electronic module (31) (or VLTP power supply) located in the door. Although not shown in this figure, this module may be located outside the door and in the vicinity of the entryway system. In case the electronic module is not always connected to the VLTP (such as through wired hinges), this power connection may be wireless (inductive) or through receptacle/pins (e.g., the retractable pins may be spring loaded) in the door which connect when the door is in a closed position. This electronic module (31) has many functions and may also have an optional backup battery module (typically a secondary (rechargeable) battery) shown as 36 or the battery pack is a separate entity in which case the electronic module 31 and the power modulator 35 are the same. The battery may be used to supply power when there is a disconnection, disruption or failure of the building power supply. Electronic module 31 also provides/modulates or conditions/distributes power to any number of VLTPs located in the door along with the other electronic devices present in this door. Only one VLT panel (37) and two electronic devices 38 and 39 are shown, but there is no limitation on the numbers of VLTPs and EDs that may be used in a system according to the present disclosure and the representative VLTP and EDs in FIG. 2 are for exemplary and illustrative purposes only and do not limit the disclosed invention. This module not only provides power, but also collects any feedback necessary from the controlled devices (including VLTs) to adjust the power or to activate certain features in those devices. In some cases module 31 continues to power other electronic devices (ED 1 (38), ED 2 (39), . . . ) even when the VLTs are not being powered in that situation. It is to be noted that ED 1, ED 2, etc., are not VLTP panels. Also, more than one electronic device may be connected in series, where a first of these EDs is connected to the electronic module 31. Electronic module 31 is also capable of communication, e.g., wireless communication (shown as 32) with external devices and systems, which may include user inputs and applications, home energy management system communications, control of lights external to the door system, weather, sun position relative to the door, time, status of the VLT (37) or the electronic devices (38, 39, . . . ), battery (36) status, etc. In one embodiment, if one or more of the VLTP breaks due to an impact or burglary, then its electrical characteristics would change and can also be communicated to an external device, and may be tied to an alarm system, camera(s), security center(s), or any other receiver. An electronic device according to the present disclosure may be a motion sensor, which when sensing an outside motion could trigger a privacy mode by darkening the VLTP, e.g., during the daytime, and at night (or during periods of darkness) could trigger turning on lights, e.g., as discussed further below. This system may also be tied to a camera system, e.g., located in or proximal to the door, which could take an image or video, and store and/or transmit the image or video to an external storage or display device. Also shown in this diagram are four switches 30a, 30b, 30c and 30d. These switches are optional. In one embodiment switch 30a is in open position when the door opens. Switches 30b, 30c and 30d may be automatically opened or closed depending on their functions or these may be put in particular positions by the user manually or remotely. Also, in one embodiment, one or more electronic devices are integrated within the electronic module 31. In another embodiment, the electronic module 31 supplies power to one or more electronic devices and the power to the VLTP is routed through a connection present in at least one of these electronic devices.

Non-limiting examples of electronic devices includes, but is not limited to so-called 'smart home' and other electronic devices listed below. These include smart (electronic) locks, doorbell cameras, visual devices (displays, optical indicators—e.g., LED lights), doorbell chime, and other audible indicators and alarms, video interfaces, audio interfaces, antenna range-extenders, digital thermometers, burglar alarm, burglar sensor, humidity sensors, pressure sensors, wind sensors, door open/shut sensor, audible noise generators. panic buttons, smart lighting (either on or adjacent to the door system such as a porch or step light), motion sensors, cameras, cameras tied to motion sensors, wi-fi bridge, transformer, data storage devices, smoke alarm, door close/shut alarm and indicators, electronic light switch, speaker, electrical outlet, or an electrical receptacle (jack) including, but not limited to, for example, a USB 2.0, Micro USB, Mini USB, 8 pin lightening, or USB C. The electronic device can have a port capable of plugging in to these said electrical receptacles. Some of these electronic devices may also provide input into the desired optical state of the VLTP, which then changes accordingly unless overridden by the user. For example, in one embodiment, the ringing of the doorbell may activate a coloring bleaching sequence of these windows. This may be of use for the hearing impaired. In another embodiment, a glass break (loss of electrical component, i.e., VLTP) in one of the entryway systems may be an indication of a burglar.

Another example of an electronic device (which may be a software or an electronic function) includes a remote electronic device controlled and activated by the location of a third party. This device delivers a wireless signal to darken the VLTP when said device is within a certain proximity of the front entryway system. The device such as a phone, watch, or fob or similar medium may be controlled automatically or manually, and may also be integrated with the delivery software of the third party. Examples of third parties may include taxi or delivery services, package delivery companies such as Amazon, DHL, UPS, FedEx, the US Postal Service or a food delivery company, such as Uber Eats or Doordash. The purpose of such connection is to provide a safety feature to an entryway system to increase the privacy of the front entryway system for a building occupant or owner as the third party delivery company approaches the building. This electronic device is called "third party activation", and may use other electronic devices integrated into the system, such as communication with a cellular system, camera and others.

When multiple VLTs are used in the door, then each of the VLTs may be connected to the module 31 separately and controlled individually, or all of these may be connected in parallel to one output. This electronic module 31 also includes inputs/outputs (33). While the inputs/outputs are represented as (33), multiple inputs/outputs may be included and these may be wired or wireless. Such connections may be used to connect additional devices at any time, which may be done during installation of the VLTPs or at a later. The wired connections may be made in any way including USB 2.0, Micro USB, Mini USB, 8 pin lightening, or USB C, etc. The communication of the electronic module with the electronic devices may be through these wired ports or wireless (blue-tooth, WiFi and near-field communication protocols). In one aspect, unit 31 is located in a housing (not shown) which is easy to disconnect for maintenance or replacement.

Figure 4:
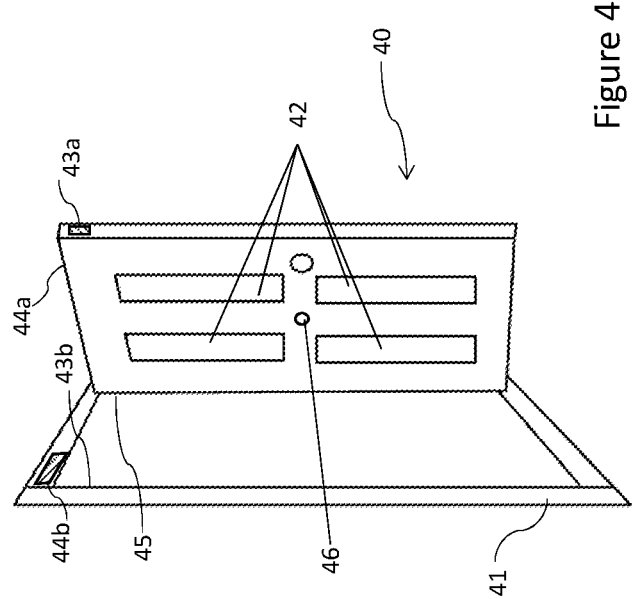
FIG. 4: Illustrates a view of a building door system according to some embodiments.

FIG. 4 shows a door 40 and a door casing (frame) 41 that may be affixed to a building structure. Four VLT windows (42) and an electronic device 46 are shown. In this case, the electronic module 31 shown in FIG. 3 is located in the door. However, if this coupling is wireless, and/or it needs to be removed and replaced for easy accessibility, it should be close to the surface of an edge, and several locations on the door are preferable. For example, an electronic module may be located as shown as 43a in a cavity within the door which is easily accessible and the main building supply is located in the casing (frame) adjacent to 43a when the door is closed in a position indicated by 43b. In this case, it is preferred that for safety of children these locations be at about 150 cm or above from the floor, and in another embodiment this distance should be about 180 cm above the floor. Another optional location for the electronic module is on the top of the door in a cavity as shown by position 44a and adjacent to a cavity (when the door is closed) in the casing where the main building supply 44b is shown. Another position in the door is to locate this close to the hinge area as shown by 45, as an example. These could be connected wirelessly by inductive coupling or physical connection, e.g., using retractable/spring loaded prongs. As discussed above, for physical connection, wires from the building power supply can also be routed through the hinges. Wired hinges are commercially available, e.g., Mckinney TA2714QC8 (from Amazon inc., Seattle, WA). This particular hinge has eight wires (4 pairs), and at least one or more EC cells may be connected to at least one pair, and the other pairs may be used for other EC cells or to the electronic features in the door. Since a door has many hinges (typically 3 to 5), one may use only one or more hinges that are wired. In this case the electronic module may be located in close proximity to the entryway system, e.g., in a wall, baseboard, etc., In this figure, connections from the door module to the various devices are not shown, but a person skilled in the art reading this disclosure will understand how to make such connections. In another embodiment, for safety reasons, the voltage transmitted from the power supply to inside the door does not exceed 50V, in another embodiment this is limited to 12V and yet in another embodiment this is limited to 5V.

Further, for this application it is important that the VLTPs are easily serviceable and/or replaceable. Further, it is common in residential buildings to retrofit different types of entryway systems (e.g., a different door which calls on for different sized and number of VLTPs, or simply a VLTP with a different color).

Figure 5:
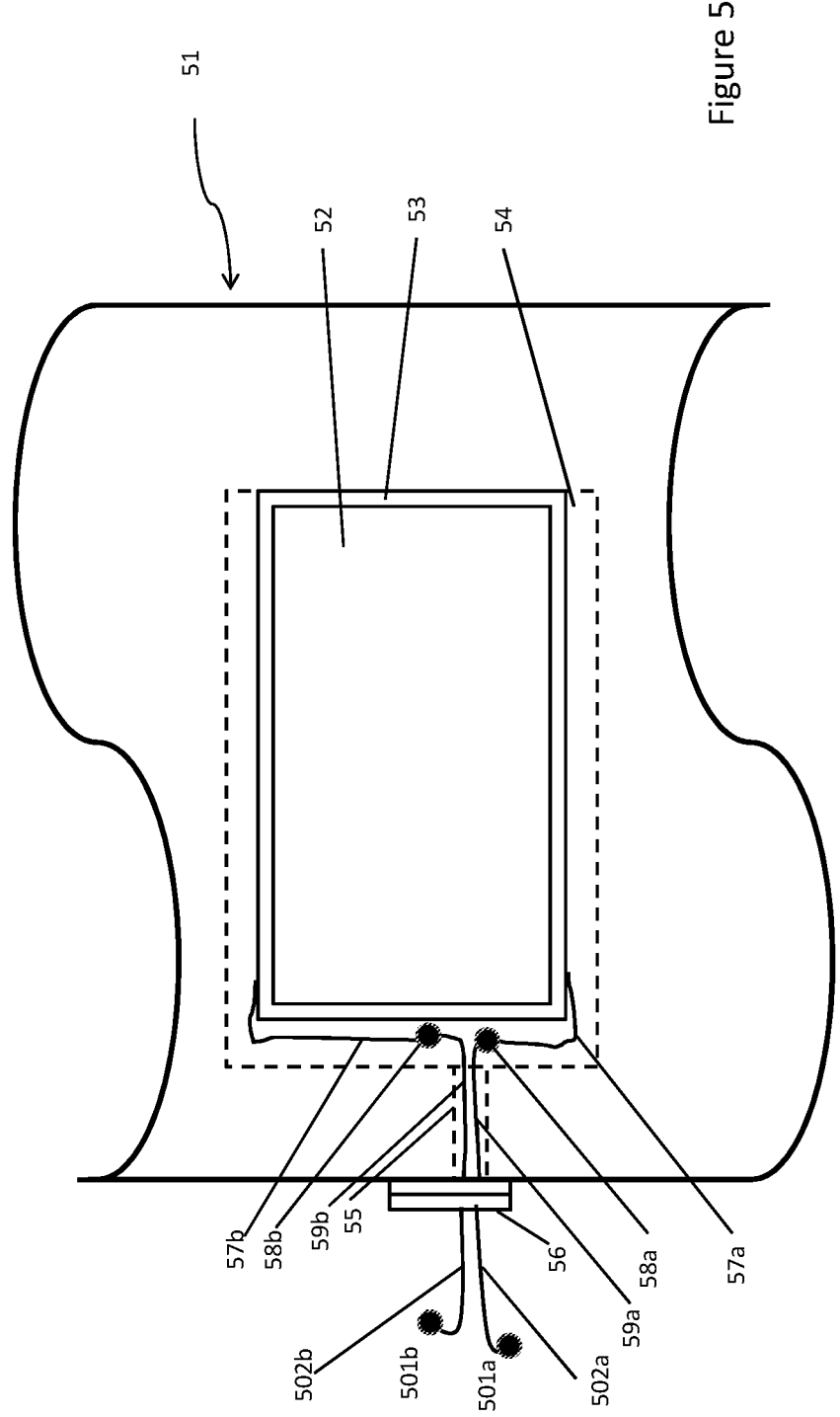
FIG. 5: Shows a partial schematic view of a door with a VLTP and a hinge.

FIG. 5 shows a cutout of a door 51 with a VLTP 52 and a bead 53 along the perimeter. The bead 53 may be raised from the door 51 surface or be flush. The hinge 56 is wired and the power is routed through hinge 56 into a hole 55, which is connected to channel 54. Channel 54 is hidden in the door 51 and may extend along sides of the VLTP 52, e.g., on one, two, three, or four sides thereof. In some aspects, channel 54 may be U-shaped channel that opens into the door cavity where the VLTP 52 is placed. It is through this channel 54 where the wires 57a and 57b are routed and a quick disconnect (e.g., a wiring nut) is placed as shown by 58a and 58b. The width of this channel is about 1 cm wide (usually less than the thickness of the VLTP or the IGU) for routing the wires from the VLTP. Typically, the quick disconnect is located in the vertical part of this channel 54. The wires 59a and 59b from this disconnect are then routed through this channel 54 then through a connected hole 55 to the hinge 56 area. In one embodiment there may be another disconnect to connect to the hinge wires, or as shown, the hinge wires are long enough to be connected to 59a and 59b. The term "hinge wire" refers to the set of wires coming out from both sides of the hinge as procured and are internally connected. One set of wires protrudes from the first side to make electrical connections to the VLTPs and the electronic devices located in the door. The wires from the second side are connected to the power supply and control unit or other electronic devices which are not part of the door (even though they may be used in the entryway system). The wires in FIGS. 5, 502a and 502b; and 59a and 59b are referred to as the hinge wires, where the former set is connected on the second side and the latter set on the first side. The hinge 56 is wired, and the wires through the hinge 56 are not shown but the wires 502a and 502b coming out from the other side of the hinge are routed through the door jamb (not shown). There may be another set of disconnects 501a and 501b to connect it to the electronic module exemplified in FIG. 3. These disconnects 501a and 501b ensure that, if an EC window has to be replaced, then the wiring from the door does not need any rewiring, and similarly the power supply may be replaced without requiring extensive rewiring. The bead 53 is so constructed and attached so that it is easy to remove, as this will allow easy replacement of the VLTP by rapidly disconnecting it electrically from the quick disconnects discussed above and lifting off the VLTP for replacement. The bead 53 is usually on one side, typically inside so that it is easier to take the window 52 out from inside and not outside. The outside may have a door cut only showing the window area or a permanently fixed bead that is not easy to remove to ensure security. The depiction in FIG. 5 applies to one or more doorlites, one or more sidelites, and/or one or more transoms of the door, except the hinge may optionally be absent in the case of a transom or a sidelite. The doorlites, sidelites and the transoms may all be electrically connected together in electric parallel to a single channel or multiple channels using one or more controllers, e.g., as depicted in FIG. 3. In one preferred embodiment, if any of the VLTPs malfunctions, deteriorates, breaks, or develops an electrical short, that problematic VLTP is automatically isolated and the other entryway VLTPs remain functional.

The optically variable transmission panels may be formed using an electrochromic or liquid-crystal technology that show a color change as discussed herein. The present disclosure also includes use of polymer dispersed liquid crystal (PDLC) panel(s), which change from clear to opaque and may be combined in an IGU configuration with an EC cell that changes color, i.e., one panel in the IGU is liquid crystal panel which does not undergo a color change (even though it may become opaque upon switching), and the second panel is an EC device that changes color. In some aspects, these are large area panels, where their size may be, for example, 100 sq cm or larger in one embodiment, and larger than 200 sq cm in another embodiment, and larger than 16,000 sq. cm for some applications. A door or a window may comprise one or several of these panels. The entirety of the variable panel may change its optical transmission, or these may be patterned so that only the selected area with the panel may have that property, or some areas may change to a different color. The VLT window may be bird-friendly glass, e.g., one or more of the panels can have a pattern that is visible/sensed by birds.

The above panels have to be powered and their optical transmission controlled as desired by the user or required per device pre-programmed kinetic parameters. Since these doors physically open and close, it is desired to provide electrical connections from the main building which are long lasting, do not fatigue and are also easy to maintain. Some of these doors and windows are mounted on hinges connecting the door (a) vertically between the door frame and the top and bottom rails or (b) horizontally between the door frame and the door stile. Or, these doors may slide, or pop-open manually or through a programmatic automated control. In one method for doors, which open by rotation movement around hinges, wired hinges are used which are discussed above.

In another method according to the present disclosure, the power is supplied by induction or conduction only when the door is in the closed position. In the latter, the power supply is brought to the fixed-frame of the door that has a first interface and it engages with another interface (second interface) located on the movable portion of the door to form an electric connection between the two, when this door is in the closed position. These could be the sides of the lock side stiles or the hinge side stiles in a door/window which when closed come in the close proximity of the frame. The close proximity is defined from touching (without forming a conductive connection) to 10 cm. In another variation the power is brought to the fixed-frame or in its vicinity, such as a door jamb to an adapter that wirelessly couples to another adapter located on the movable door/window when the said door/window is in the closed position. This could be an inductive coupling as used in wireless cell-phone charging. In both of the above there is no power transmission when the door is in the open position. In another embodiment power is provided through the wired hinges as discussed earlier so that there is no interruption of power when the door is in the open position.

Further, the VLT devices are rarely powered using the voltage supplied by the building, the power has to be conditioned, e.g., converted to a low voltage DC supply for electrochromic panels (typically in the range of ±5V), and for the liquid crystal panels it may require a step down in voltage to a range of 20 to 100V AC, and may even require a frequency conversion in a range of 50 to 400 Hz with a change in the waveform. Further, there may be other nuances in the power supply, such as for EC devices applying a ramp or a step potential during coloration (darkening of the panel) or bleaching (lightening of the panel to a more transmissive state), and maintaining an intermittent powering during a period where a certain optical state is maintained. The electronic devices may have different power requirements as compared to the VLTPs and amongst each other, and also communication with each electronic device could be different and may require communication with a control system as mentioned before. In another embodiment, the power modulator 35 or electronic module 31 may also be located outside of the movable door or window and the devices in the door may be connected by cables using interfaces which are similar to the wired alternatives between the main building power supply and the module 31. Electrochromic panels typically require ±5V DC, and other devices may have different AC or DC powering requirements (e.g., if any PDLC panels are used). In another embodiment, the module 31 may also be located in the fixed part of the building where the power to the door is transmitted through a multi-pin connector for each of the devices, and then power would also be turned-off to all of these devices when the door is in an open position, unless there are dedicated battery-based power supplies to certain electronic devices. This power supply may also power the transom and the sidelitess if these have VLTPs.

Control of the panel, that is when to apply the power, how to electronically monitor the glass, and the details of powering during coloration, bleach and during maintenance of the optical state, are determined by the control electronics. The electronic module may receive instructions to change its optical state via a user interface or it may be through one or more sensors that also feed into this electronic module where a decision is made to trigger an event for the VLTPs to change their transmission. The control-electronics may be a separate box or housed within the confines of the power conditioner. The module 31 in FIG. 3 includes all of the above elements, other than any control or input that emanates from outside of the door. For easy maintenance, it is highly desired that these be located so that these are easy to access and remove and then replace or repair in the event these components are not operating to existing or future upgraded standards.

In another aspect, a rechargeable battery or a super-capacitor can be integrated to provide power to the VLTPs and the control panel, and/or other electronic components which have to be powered. The battery may be charged all the time or at pre-selected duration when the power-load on the grid is low. A solar panel may also be integrated in the entryway for a power-source. Although not shown in FIG. 3, the solar cell may be connected to power modulator 35 and/or the electronic module (31). The incoming power from the solar cell and the building mains will be modulated so as to minimize the use of the power from the building mains.

When there are several panels in a door or a window which have VLT properties (individual EC cells), these may be powered by a common power-conditioner by using a set of parallel cables connecting all of the individual cells, or separate cables may be used from the power-conditioner to connect each panel. The latter has the advantage of powering and even controlling each panel separately so that in case one of the panels develops an electrical short or experiences a problem, then that issue can be isolated only to that panel, or the panels could be colored differently from each other. In such aspects, each building element that opens, whether it is a door, or a window will have its own power-conditioner and a signal-panel. The wires to the panels may be routed through cavities or channels in the rails, mullions, stiles, or other solid dividers. When wired hinges are used, a hole or a channel running horizontally from where the wires come out of the hinge runs into the vertical stile of the door to meet the vertical channel or holes from where the wires are routed to the EC cells and other electronic devices. In one embodiment, there are channels next to the VLTPs to run the wiring system and have easy access. The wires from the VLTPs may be connected to the wires leading to the power supply (e.g., through the hinges) in the above-mentioned channels using quick disconnects (e.g., wire-nuts) so that it is easy to remove and replace these panels without having to change the entire wiring assembly.

The transmissivity of the VLTPs may be changed automatically via desired algorithms and input from the sensors, as discussed below or by user overrides through an appropriate interface. The user-interface may be a switch on the wall or on the door, which the users activate when the optical transmission has to be changed, which communicates wirelessly to the control panel or is hard wired through the same interface by which power to the door is provided. Other user interfaces may include an electronic communication device, e.g., a smart phone, smart watch, smart wearable device, a remote used to control TV and/or other appliances, home automation systems including but not limited to Amazon's Echo® and Alexa® devices, Google's Google Home and Apple's HomePods, or other remote human machine interfaces, such as a home-to-smart electrical grid interconnection, automobile, or other remote control programmable interfaces.

Control may be done in many ways and these may also be overridden by the user (for example a building occupant or custodian). One important aspect of VLT windows is to allow the light to come in and also be able to enjoy the outside views, but also be able to preserve the indoor privacy. As discussed below, privacy of a transmissive panel will depend on several factors, including the optical properties of this VLT panel and the light intensity (or illumination level) outside of the door/window, optical glare from the sun and the illumination level inside the area partitioned by this door/window. This would mean that for a given transmissive panel, privacy will also be determined by outdoor lighting conditions and indoor illumination.

An optical element with a certain visible reflectivity of the light from outside ("R") and visible transmissivity of the light from the indoor to the outside ("T") can have a privacy "P" defined based on the inside illumination level ($L_I$) and the external illumination levels ($L_E$) as $$P=(R \times L_E)/(T \times L_I) \quad \text{(Equation 2)}$$

When "P" equals or exceeds 5, it is difficult for a person standing outside to see the image clearly of the interior, which means that the glass provides privacy. This is particularly important when it is dark outside of the building, e.g., at night. Nighttime or a dark outside environment is defined when the solar illumination outdoors falls below 10 Lux. Since the "T" of a variable transmission glass can be reduced more substantially as compared to the changes in "R". In addition, the EC glass panel may be designed with higher visible reflectivity, e.g., R>15% in one embodiment and >20% in another embodiment. In the above equation both R and T are expressed in percentage as compared to air and $L_I$ and $L_E$ in lux. Both R and T may focus on photopic visible transmission (or at 550 nm) or scotopic visible transmission (or at 500 nm). For example, see U.S. Pat. No. 11,287,717 (entitled: Variable Light Transmission Structures with Improved Optical Properties) for use of interference stacks below the transparent conductive coatings to increase the reflectivity of the glass, which is incorporated herein by reference in its entirety. Thus, by controlling the light outside the building during nighttime by an artificial illumination source and reducing the transmission of the interior light by changing the "T" value of the EC cell, it would be easy to create a light flux of an intensity $L_E$ so that for a given $L_I$, privacy is maintained, e.g., privacy of the interior is maintained when viewed from the exterior of the building. The above is not only true from external to internal, but also between any two portioned places space 1 and space 2, where privacy is maintained from a person standing near the window in space 1 and looking into space 2 through this window. In that case, illumination in space 1, can be denoted by $L_1$, and for space 2 it would be $L_2$. In the above equation, $L_I=L_2$ and $L_E=L_1$. Alternatively, the door has sensors (or has access to sensor inputs located near the door which can determine the outside light illumination level (on one side of the closed door) and the inside light illumination (the other side of the closed door). Depending on the differential or ratios of these illumination levels, the optical panels may be darkened appropriately so that indoor privacy is obtained. In one specific case during the nighttime if the external illumination is the same as internal illumination (i.e., $L_E$ and $L_I$ are the same), then external reflectivity R>5×T to achieve privacy according to the above equation. In case the external illumination is half as intense as the internal illumination, then to achieve privacy R>10×T.

Since the transmission of these VLTP can be changed, in one embodiment at nighttime, illumination (or light) sensors located on the outside and the inside of the window (openable or not) would trigger an illumination change of outside (or outside and the inside lights depending on the setting desired by the user) while also changing the light transmission of the VLTP so that privacy from the outside to the inside is automatically restored. With illumination conditions changing on the inside for example, a privacy mode setting would automatically adjust the light transmission properties of the VLTP and e.g., also the outdoor illumination to maintain privacy (e.g., a porch light, or lights located at the outside perimeter of the building) when there is a change in indoor or solar illumination. In addition, in one embodiment, VLTPs with visible outdoor reflectivity of greater than 15% in the clear or fully darkened states are preferred so that it is more effective to maintain the privacy from the outside to the inside. In another embodiment the visible reflectivity of 20% or more is desired. The electronic module discussed above is used to trigger the change in the VLTP and the light. The light intensity sensors may be an electronic device located in the door. It is to be noted that when these light sensors trigger an illumination source then a feedback loop will be provided to the electronic module to ensure that this illumination is not turned-off prematurely.

Additionally, further privacy can be reached if one or more of the substrates comprising the VLTP is frosted in at least one of its surfaces as mentioned above. In this case the haze level will add to the privacy reached with the darkness of the VLTP and the illumination levels of interior and exterior spaces while having superior energy efficiency aspects as compared to simple frosted glass. The frosted glass may be also replaced by a liquid crystal containing panel that switches from clear to opaque when activated by an electric signal, and this can provide additional attributes and control.

To enhance the utility of these VLTPs, they may also be laminated to additional glass sheets using polymeric interlayer sheets (e.g., poly vinyl butyral sheets in a thickness range of about 0.7 mm to 3 mm), which can provide additional safety against breakage and/or wind loads, and depending on the grade of the material will also reduce transmission of noise and vibrations from being transmitted from outside to the inside of the building or vice-versa. For example, S-Lec 0.76 mm thick sound acoustic PVB film (from Sekisui North America, Winchester, KY) can achieve this. The interlayers designed for superior noise reduction usually comprise three or more layers (within a single film) and achieve a sound reduction in a range of about 1000 to 10,000 Hz, and about 10 dB or more at 5000 Hz (as compared to those interlayer films which are not designed for sound reduction). These interlayer sheets also provide enhanced UV blockage to protect both the VLTPs and also the objects inside the buildings from UV damage when these are used to laminate the VLTPs facing the outside of the IGU (e.g., see published U.S. patent application No. 20220220801 for desired UV blocking characteristics, which is incorporated herein by reference in its entirety). Furthermore, some of these films may also provide absorption in near-infrared (NIR) if that is needed to block the heat in all weather conditions from the sun in a wavelength range selected from within 750 to 2500 nm. The film may also be colored to provide specific appearance and complimentary coloration to the color of the VLTPs. In some cases, the film may have regions of different colors or patterns (e.g., embedded fabrics) to provide a certain appearance which may be further enhanced when the VLTP colors. One of the substrates may also have a screen or digitally printed pattern using polymeric and or ceramic inks to provide a stained-glass appearance, which changes in its appearance when the VLTP colors. In some instances, the VLTPs also modulate the light transmission both in visible and in the NIR, and then this is not required from the interlayers. Additionally, when the outside VLTPs are laminated to colored glasses and or glasses with reflective coatings they impact the outside appearance and also the color of the transmitted light (as taught in published U.S. patent application No. 2022022080, the teachings of which are included herein by reference). High reflectivity also assists with enhanced privacy as discussed herein.

The present disclosure also includes the following aspects:

1. A method of electrically powering a variable light transmission panel (VLTP) located in a door or a window, wherein the said door or window comprises a stationary frame that is installed in a building, and a movable element that can be mechanically moved between a closed position and an open position and the said movable element contains the VLTP, wherein the method further comprises:
   connecting electric power to the VLTP when the said movable element of the door or the window is in the closed position; disconnecting the electric power to the said VLTP when the said movable element of the door or the window is in the open position.

2. The method of aspect 1, wherein said VLTP is an electrochromic element.

3. The method of aspect 1, wherein said VLTP of aspect 1 is assembled with another clear panel as an insulated glazing unit prior to its incorporation into the said door or the window.

4. The method of aspect 1, wherein a terminal for electric power supply of the building is located on the stationary frame, and the said VLTP connects with the said electric power supply through an electronic module.

5. The method of aspect 4, wherein the said electronic module and the building electric power supply are connected through a wired or wireless connection.

6. The method of aspect 5, where the connection is wireless comprising inductive coupling.

7. The method in aspect 1, wherein a user interface or a control system is connected wirelessly to at least one of an electronic modules and through a wire to a module located in the door frame.

8. The method of aspect 4, wherein the electronic module is connected to a battery.

9. The method of aspect 4, wherein the electronic module is connected to at least one electronic device which is not a VLTP.

10. A user interface or a control system connected wirelessly to at least one of the electronic modules and the said electric power supply of aspect 1.

11. The method as in aspect 1, further comprising one or more electronic devices which are not VLTPs.

12. A smart window comprising an electronic module and a VLTP that partitions two spaces into a first space and a second space, and wherein the first space has an illumination level of $L_1$ and the second space has an illumination level of $L_2$, and wherein the smart window is configured such that a privacy, P, of the first space through the said VLTP from the second space is controlled by adjusting the illumination between the two spaces relative to each other and the visible transmission of the VLTP, such that a value of P≥5 according to $$P=(R*L_2)/(T*L_1), \text{ where}$$

R is visible reflectivity of the VLTP in the second space, and

T is visible transmission of the VLTP.

13. The smart window of aspect 12, where the illumination level of the first space relative to the illumination level of the second space and the transmission of the VLTP are controlled automatically by a control system of the smart window.

14. The smart window of aspect 13, wherein the control system is configured to communicate with a light source in the first space or the second space to increase or decrease the amount of light output by the light source.

15. The smart window of aspect 14, wherein the control system is configured to control transmission of light through the VLTP.

16. The smart window of aspect 12, further comprising one or more of a battery, a super-capacitor, and/or a solar panel.

17. The smart window of aspect 12, wherein the smart window is integrated into a door.

18. A variable transmission optical panel (VLTP) located in a building door or window, wherein the said building door or window comprises a frame that is installed in a building, and a movable element that can be mechanically moved between a closed position and an open position and the said movable element contains the VLTP and at least one electronic device, further comprising:
   an electronic module connected to an electric power supply of the building to receive electric power and provide electric power to the VLTP and the said electronic device;
   wherein the electric power from the building electric power supply to the electronic module is connected when the said movable element of the building door or window is in the closed position and is disconnected from the building electric power supply when the said movable element is in the open position.

19. The VLTP of aspect 18, wherein the electronic module comprises a rechargeable battery to provide power to the said at least one electronic device when the movable element is in the open position.

20. The VLTP of aspect 18, wherein the VLTP is not powered when the movable element is in the open position.

21. The VLTP of aspect 18, wherein the at least one electronic device comprises at least one of an electronic lock, a light, a visual device, a doorbell chime, an audible indicator, an alarm, a video interface, an audio interface, an antenna range-extender, a digital thermometer, a panic button, smart lighting, a motion sensor, a camera, a wi-fi bridge, a transformer, a smoke alarm, a door close/shut alarm and indicator, an electronic light switch, a speaker, an electrical outlet, and an electrical receptacle.

22. The VLTP of aspect 18, wherein said electronic module is configured to wirelessly connect to the building electronic supply.

23. A variable transmission optical panel (VLTP) located in a building door or a window, wherein the said building door or window comprises a stationary frame that is installed in a building, and a movable element that can be mechanically moved between a closed position and an open position partitioning first and second spaces on each side of the movable element; and an electronic module which controls the transmission of the said VLTP and at least the output intensity of a light located in one of the said first and second spaces, so as to provide privacy through the VLTP when viewed from the space having the said light, wherein the said movable element contains the said VLTP and at least one electronic module and at least one electronic device, wherein: the electronic module connects to an electric power supply of the building to receive power and provides electric power to the VLTP and the said electronic device; and wherein power from the electric power supply of the building to the electronic module is connected when the said movable element of the door or the window is in the closed position and is disconnected when the said movable element is in the open position.

24. A VLTP comprising a substrate, wherein an outside surface of the substrate is laminated to a second transparent substrate using a polymeric film wherein the second transparent substrate and the polymeric film have at least one of the following optical properties:
  (a) one side of the second transparent substrate is coated and has increased visible reflectivity when observed from an opposite non-coated side of the second transparent substrate as compared to its visible reflectivity when it is not coated,
  (b) the second transparent substrate is tinted,
  (c) the polymeric film is tinted,
wherein the VLTP has less than 50% change in reflected color when observed through the said second transparent substrate when the VLTP changes from a bleached state to a colored state as compared to a reflective color change of the VLTP when it is not laminated.

25. A VLTP comprising a substrate, wherein an outside surface of the substrate is laminated to a second transparent substrate using a polymeric film wherein the second transparent substrate and the polymeric film have at least one of the following optical properties:
  (a) one side of the second transparent substrate is coated and has increased visible reflectivity when observed from an opposite non-coated side of the second transparent substrate as compared to its visible reflectivity when it is not coated,
  (b) the second transparent substrate is tinted,
  (c) the polymeric film is tinted,
wherein the VLTP has less than 50% change in reflected color when observed through the second transparent substrate when the VLTP changes from a bleached state to a colored state as compared to a reflective color change of a VLTP that is laminated to clear non-tinted and non-coated glass using a polymeric film which is not tinted.

26. An IGU containing a VLTP comprising a substrate wherein an outside surface of the substrate is laminated to a second transparent substrate using a polymeric film wherein the second transparent substrate and the polymeric film have at least one of the following optical properties:
  (a) one side of the second transparent substrate is coated and has increased visible reflectivity when observed from an opposite non-coated side of the second transparent substrate as compared to its visible reflectivity when it is not coated,
  (b) the second transparent substrate is tinted,
  (c) the polymeric film is tinted,
wherein the IGU has less than 50% change in reflected color when observed through the second transparent substrate when the VLTP changes from a bleached state to a colored state as compared to a reflective color change of the IGU containing a VLTP that is not laminated.

27. An IGU containing a VLTP comprising a substrate wherein an outside surface of the substrate is laminated to a second transparent substrate using a polymeric film wherein the second substrate and the polymeric film have at least one of the following optical properties:
  (a) one side of the second transparent substrate is coated and has increased visible reflectivity when observed from an opposite non-coated side of the second transparent substrate as compared to its visible reflectivity when it is not coated,
  (b) the second transparent substrate is tinted,
  (c) the polymeric film is tinted,
wherein the IGU has less than 50% change in reflected color when observed through the second transparent substrate when the VLTP changes from a bleached state to a colored state as compared to an IGU having a VLTP laminated to clear non-tinted and non-coated glass using a polymeric film which is not tinted.

28. The VLTP or IGU of any of aspects 24 to 27, wherein the reflectivity is measured by placing a white or a black background behind the VLTP or IGU containing the VLTP.

29. An IGU containing a VLTP comprising a substrate wherein an outside surface of the substrate is laminated to a second transparent substrate using a polymeric film wherein the second transparent substrate and the film have at least one of the following optical properties:
  (a) one side of the second transparent substrate is coated and has increased visible reflectivity when observed from an opposite non-coated side of the second transparent substrate as compared to its visible reflectivity when it is not coated,
  (b) the second transparent substrate is tinted,
  (c) the polymeric film is tinted,
wherein the IGU has $\Delta E^*$ less than or equal to 25 when observed in reflection through the second transparent substrate when the VLTP changes from a bleached state to a colored state when an outside surface of the IGU opposite the VLTP is in contact with a white background; and the concomitant change in $\Delta E^*$ in transmission of the said VLTP is greater than 35.

30. An IGU containing a VLTP comprising a substrate wherein an outside surface of the substrate is laminated to a second transparent substrate using a polymeric film wherein the second transparent substrate and the polymeric film have at least one of the following optical properties:
  (a) one side of the second transparent substrate is coated and has increased visible reflectivity when observed from an opposite non-coated side of the second transparent substrate as compared to its visible reflectivity when it is not coated,
(b) the second transparent substrate is tinted,
(c) the polymeric film is tinted,
wherein the IGU has ΔE* less than or equal to 10 when observed through the second transparent substrate in reflection when the VLTP changes from a bleached state to a colored state when an outside surface of the IGU opposite the VLTP is in contact with a black background; and the concomitant change in ΔE* in transmission of the said VLTP is greater than 35.

The foregoing description of the invention has been presented for purposes of illustration and description and is not intended to be exhaustive or to limit the invention to the precise form disclosed, and obviously, many modifications and variations are possible considering the above teaching. The embodiments were chosen and described to best explain the principles of the invention and its practical application to thereby enable others skilled in the art to best utilize the invention in various embodiments and with various modifications as are suited to the use contemplated. Moreover, the descriptions of such embodiments, combinations, and sub-combinations are not intended to convey that the claimed subject matter requires features or combinations of features other than those expressly recited in the claims. Accordingly, the scope of this disclosure is intended to include all modifications and variations encompassed within the spirit and scope of the following appended claims.

EXAMPLES

Example 1: Optical Properties of EC Cells

Five electrochromic panels (or EC cells) were made and evaluated for their properties so that they were suitable for the entryway system and showed a large color difference in their bleached and colored states. For purposes of this example, these were made using two conductively coated glass plates each 2.2 mm thick which were placed in a parallel arrangement with the conductive coatings facing each other, and the glass plates were separated by a 0.3 mm thick electrolytic layer. Their properties are shown in Table 1. The electrochromic color was varied by placing electrochromic coatings on the conductive coatings and/or using different electrochromic dyes in the electrolytic layer. These panels were colored by applying a voltage of 1.3V across the two transparent conductors. EC Cell 1 colored to a deep blue color, and EC Cell 2 colored to a brownish/grey color. Their transmission at 550 nm and color coordinates of the cells in bleached and colored states are also shown. All color, transmission and haze measurements were made using standard illuminant D65 with the instrument Ultrascan® Pro from Hunterlab (Reston, VA).

TABLE 1

EC Properties and color of the various EC cells in transmission

| EC Cell | Optical State | % T at 550 nm | L* | a* | b* | c* | Qualitative Color Description | ΔE* |
|---|---|---|---|---|---|---|---|---|
| EC Cell 1 | Bleached | 79.5 | 90.5 | −2.0 | 10.2 | 10.4 | Slight yellow | 84.8 |
|  | Colored | 3.0 | 34.4 | 3.4 | −53.3 | 53.4 | Blue |  |
| EC Cell 2 | Bleached | 76.6 | 89.8 | −1.6 | 3.6 | 4.0 | colorless | 65.1 |
|  | Colored | 8.0 | 24.9 | 3.7 | 4.3 | 5.7 | Brownish-black |  |
| EC Cell 3 | Bleached | 81.3 | 91.9 | −1.2 | 2.6 | 2.9 | colorless | 97.6 |
|  | Colored | 0.1 | 16.2 | 29.6 | −50.8 | 58.7 | Purple |  |
| EC Cell 4 | Bleached | 80.6 | 91.4 | −1.4 | 4.4 | 4.6 | colorless | 82.7 |
|  | Colored | 0.9 | 10.9 | −4.5 | −14.3 | 15.0 | Blue-green |  |
| EC Cell 5 | Bleached | 79.4 | 90.4 | −2.0 | 10.1 | 10.3 | Slight yellow | 80.3 |
|  | Colored | 3.1 | 34.7 | 2.7 | −53.1 | 53.2 | Blue |  |

TABLE 2

Difference in transmittd color (ΔE*) between different EC cells in the colored state

| EC Cell | Optical State | EC Cell 2 | EC Cell 3 | EC Cell 4 | EC Cell 5 |
|---|---|---|---|---|---|
| EC Cell 2 | Colored | 0.0 | 61.5 | 24.7 | 58.3 |
| EC Cell 3 | Colored | 61.5 | 0.0 | 50.1 | 32.6 |
| EC Cell 4 | Colored | 24.7 | 50.1 | 0.0 | 46.1 |
| EC Cell 5 | Colored | 58.3 | 32.6 | 46.1 | 0.0 |

Figure 9:
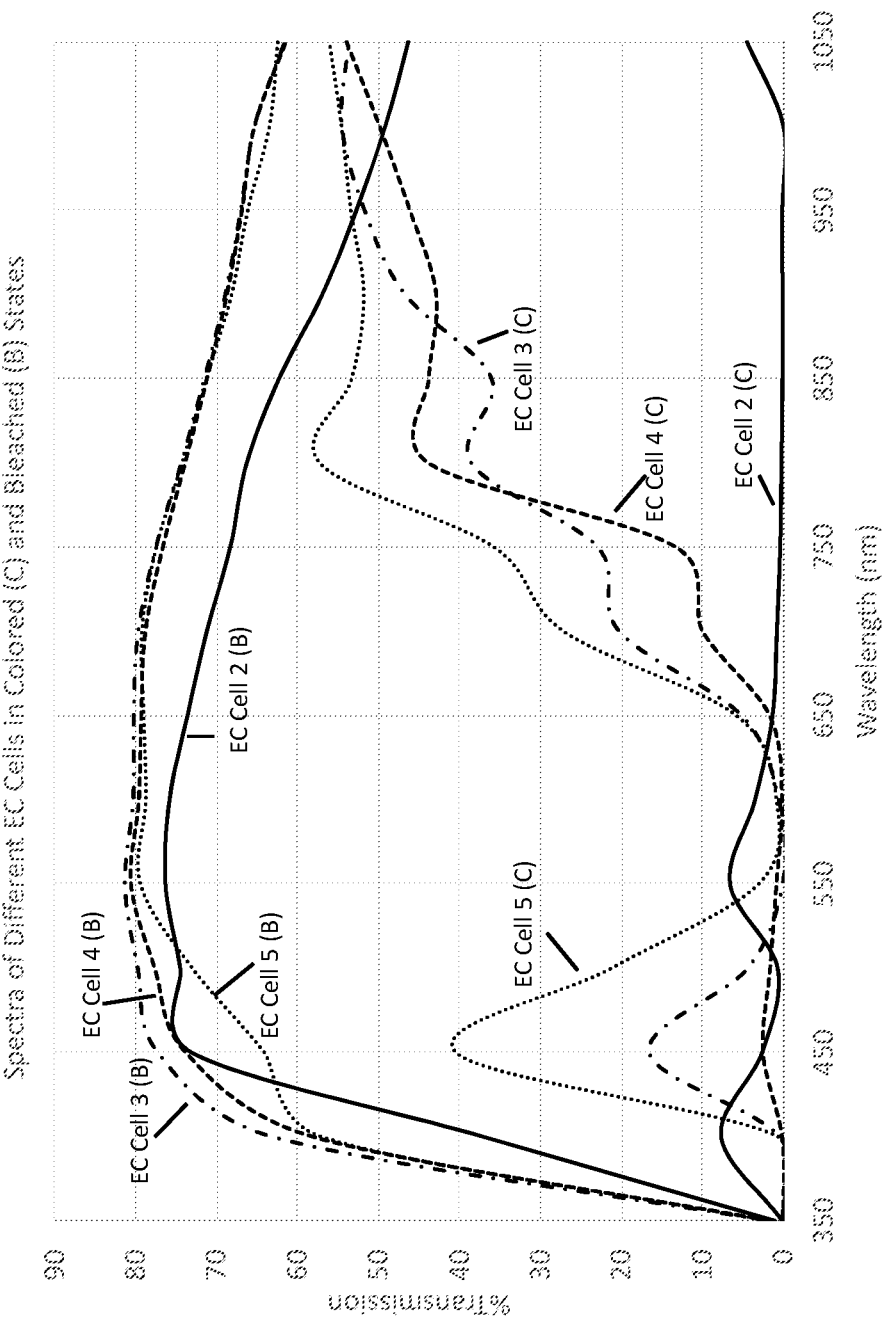
FIG. 9 shows the transmission optical spectra of various EC cells (or EC glasses or EC panels or VLTPs) in darkened (colored) and bleached states (measurement mode was in transmission).
Figure 10:
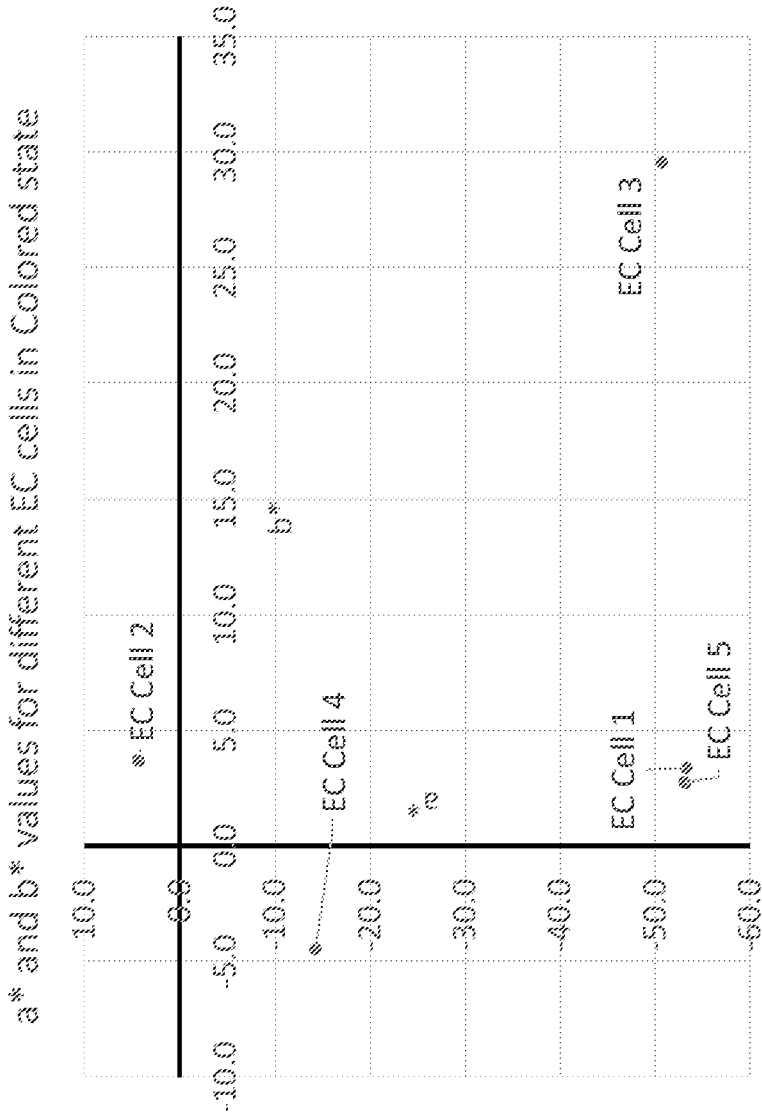
FIG. 10 shows the color values a* and b* plotted against each other for the different EC cells.

The color difference ΔE* between the colored and bleached state was calculated as shown in Equation 1. As seen in Table 1, the color difference for the above devices in the two states (i.e., between their respective colored and the bleached states) is more than 35. These panels did not have notable optical haze, i.e., about or less than 1% haze. Also note that although EC cell 1 and EC cell 5 are different EC cells, but they have similar construction and use the same EC materials, and thus their optical properties and coloration are also similar. FIG. 9 shows the optical spectrum in transmission for the colored and the bleached states for EC cells 2, 3, 4 and 5. FIG. 10 shows a plot of a* values vs b* for all of the five EC cells in the colored state.

Example 2: Optical Properties of Select IGUs with EC Cells and Clear Low-e Glass The two VLTPs (EC cell 1 and EC cell 2) were combined separately with 3.2 mm thick TEC10 glass (TEC 10 has a low-e coating on its surface) to form two different IGUs where the low-e coating faced the gap, which was 0.375 inches (9.5 mm). The gap was filled with air. The transmission and the colors in transmission for these IGUs are shown in Table 3. This construction is similar to that shown in FIG. 6b. All of these IGUs had negligible optical haze in all optical states which were measured between 0.9 and 1.25% on the Hunterlab instrument.

TABLE 3

IGUs made with EC cell and clear glass coated with Low-e coatings, color properties measured in transmission

| IGU (optical state)) | Optical State | % T at 550 nm | L* | a* | b* | c* | ΔE* |
|---|---|---|---|---|---|---|---|
| IGU 1 EC Cell 1 + TEC10 | Colored | 67.0 | 84.4 | −2.1 | 11.8 | 12.0 | 80.7 |
|  | Bleached | 2.5 | 31.3 | 1.5 | −48.9 | 48.9 |  |
| IGU 2 EC Cell 2 + TEC10 | Colored | 64.2 | 83.6 | −2.0 | 5.5 | 5.8 | 61.9 |
|  | Bleached | 6.4 | 22.0 | 3.2 | 4.6 | 5.6 |  |

When measured using Hunterlab instrument, these IGUs also show that the transmitted color difference in the bleached and the colored state is large and are suitable for use in the front entryway system.

In another variation a calculation (using Windows thermal program available from Lawrence Berkeley) was made for an R value. This IGU had a VLTP as described above which was laminated to another 2.2 mm thick glass using a PVB interlayer of 0.76 mm thick. When this is combined with a second pane which was a TEC10 glass (TEC10 glass is a clear glass coated with a Low-e glass. In this construction), with a 12.5 mm argon gap, an R Value of 3.5 (° F.-ft²-hour)/ Btu).

Example 3: Optical Properties of IGUs with Select EC Panels Combined with Frosted Glass In this example, using the same two VLTPs that are described in Example 1 were again formed into IGUs, using the second panel as frosted glass rather than TEC10 (that was used in Example 2). All measurements in this example were made using the Hunterlab instrument. The frosted glass by itself has a transmission of 78.5% at 550 nm and its L*, a* and b* values respectively were 90.8, −0.86 and 1.09 and had an optical haze of 90%. Only one surface of the glass was frosted which faced outside, the non-frosted side facing the gap to form an IGU and the gap was 0.375 inches (9.5 mm) and filled with air. The transmission at 550 nm and the colors in transmission for these IGUs are shown in Table 3. The optical haze for all of these IGUs in colored and bleached states was also measured at 90% (same as the frosted glass by itself) which provided high privacy.

TABLE 4

IGUs made with EC Cell and frosted glass, color properties measured in transmission

| IGU (optical state)) | Optical State | % T at 550 nm | L* | a* | b* | c* | ΔE* |
|---|---|---|---|---|---|---|---|
| IGU 3 EC Cell 1 + Frosted Glass | Bleached | 62.7 | 82.2 | −2.5 | 10.5 | 10.7 | 78.8 |
|  | Colored | 2.3 | 30.1 | 2.3 | −48.5 | 48.5 |  |
| IGU 4 EC Cell 2 + Frosted Glass | Bleached | 59.1 | 80.8 | −2.4 | 4.0 | 4.7 | 59.9 |
|  | Colored | 6.0 | 21.2 | 3.1 | 3.9 | 5.0 |  |

It must also be noted that using a clear glass instead of frosted glass would not have resulted in as large change in colors or ΔE*. This can be seen from the color changes of the individual cells EC cell 1 and EC cell 2 in Table 1, or even compared to corresponding IGUs Table 3 where a clear glass coated with a clear low-e coating is used. These VLTPs and IGUs containing these panels may be used in the entryway system as they show a large difference in color in the colored and bleached state in transmission (transmitted light). One of the side of the frosted glass may have been also coated with a low-e coating. In another variation the frosted side could have also faced the gap.

Example 4: Properties of IGUs Formed by Two EC Cells which Darken to Different Colors In this example an IGU was formed by using two EC cells arranged in parallel which are separated by a gap filled with air. The width of the air gap was 0.375 in (9.5 mm). In reference to FIG. 6b, both 65 and 62 are EC cells and there is no low-e coating as shown, although it may have been incorporated by coating one of the surfaces or by adhering a film with a low-e surface, or even inserting a third thin glass element within the air gap which was coated with a low-e coating. Although both EC cells could have been similar, but in this example, we chose to form these IGUs using two EC cells, each of which colored (in their dark state) to a different color. The properties of the individual EC cells (or the VLTPs) used to make the IGUs in this example are shown in Table 1 (Example 1). All measurements in this example were made using Hunterlab instrument, and the % transmission at 550 nm and color properties in transmission of these IGUs are shown in Table 5.

TABLE 5

IGUs formed with two electrochromic cells which have a different Color in colored state, color properties measured in transmission

| IGU-EC cells used | Optical state | % T at 550 nm | L* | a* | b* | c* | ΔE* |
|---|---|---|---|---|---|---|---|
| IGU-5 EC cell 4 + EC Cell 5 | Both EC cells bleached | 64.87 | 83.1 | −2.9 | 13.0 | 13.3 |  |
|  | Both EC cells colored | 0.03 | 1.3 | 3.1 | −11.9 | 12.3 | 85.7 |
|  | Only EC cell 4 colored | 0.64 | 8.2 | −6.3 | −10.1 | 11.9 | 78.4 |
|  | Only EC cell 5 colored | 2.35 | 30.3 | 0.9 | −47.5 | 47.5 | 80.3 |
| IGU-6 EC cell 3 + EC Cell 5 | Both EC cells bleached | 65.2 | 83.4 | −2.7 | 12.1 | 12.4 |  |
|  | Both EC cells colored | 0.03 | 4.8 | 21.7 | −39.1 | 44.7 | 96.9 |
|  | Only EC cell 5 colored | 2.34 | 30.6 | 1.4 | −48.3 | 48.3 | 80.3 |
|  | Only EC cell 3 colored | 0.04 | 12.4 | 23.8 | −42.4 | 48.6 | 93.3 |
| IGU-7 EC cell 3 + EC Cell 4 | Both EC cells bleached | 66.2 | 84.3 | −2.3 | 6.5 | 6.9 |  |
|  | Both EC cells colored | 0.02 | 0.4 | 2.9 | −6.4 | 7.0 | 85.1 |
|  | Only EC cell 4 colored | 0.65 | 8.6 | −4.9 | −12.6 | 13.5 | 78.1 |
|  | Only EC cell 3 colored | 0.06 | 13.2 | 26.1 | −45.6 | 52.5 | 92.6 |

In any of the three configurations of the IGUs, (IGUs 5, 6 and 7) when any one of the EC cells is colored, it results in large transmitted color ΔE* change. For any IGU, the color coordinate for each colored state is different, which shows that for each of the IGUs three different colored states are achieved, i.e., the ability for the user to change color. Further for IGUs 6 and 7, the colored state when both EC cells are colored is very deep with transmissions less than 0.1% providing much higher levels of privacy. For IGUs 5 and 7 when both EC cells are colored, the value of c* in the colored state is less than or equal to 15, showing that it offers more neutral coloration as compared to the state when only one EC cell is colored when c* are far greater. Particularly for IGU 7, the c* value is 7 or less in both completely bleached states and completely colored states, while offering more intense color when only one EC cell is colored. IGU 6 achieves many of the targets including very dark transmission at 550 nm, however as seen from Table 1, the a* and b* of both of these cells have the same polarity, and thus it does not result in a more neutral coloration when combined (high c* value).

Example 5: Examples of IGUs Containing a Third Element (Triple Pane)

This example is equivalent to having a triple pane IGU, an outside panel, an inside panel and a third panel within the gap separating the inside and the outside panels. In this example, two IGUs were formed where the air gap in each IGU was further partitioned into two air gaps by placing a thin 1.1 mm thick glass coated with a low-e coating. The low-e coating was an indium-tin oxide (ITO) coating with a surface resistivity of 9.5 ohms/square. The gaps on either side of the thin glass were not sealed from each other, and each partitioned gap was 0.375 inch (9.5 mm) wide. The optical properties of this thin element by itself is shown in Table 6. All measurement in this example were made using Hunterlab instrument.

The first IGU (IGU-8) was similar to the IGU 3 in table 4 formed in the sense that in both cases frosted glass and EC cell 5 (facing outside) were used which were separated by an air gap. In IGU 8, the air gap was further partitioned (or there were two air gaps) on both sides of the thin glass where the low-e coated surface faced the EC cell 5. The thickness of the air gap on either side of the thin glass was 0.375 inch (9.5 mm). Please note that the optical properties of EC cell 1 are similar to the EC cell 5.

In the second IGU (IGU-9), the same two EC cells were used as shown in IGU 5 (Table 5), that is with EC cell 4 and EC cell 5. As in the above IGU, the air space was partitioned using a third glass element. This was a thin glass substrate which was 1.1 mm thick glass with a ITO coating on one of its surfaces (low-e surface). The low-e coating, faced EC cell 5 (outside position). The air gaps were 0.375 inch (9.5 mm) each on both sides of the thin element. The optical properties and color of these two IGUs in transmission are shown in Table 6 below.

Figure 11:
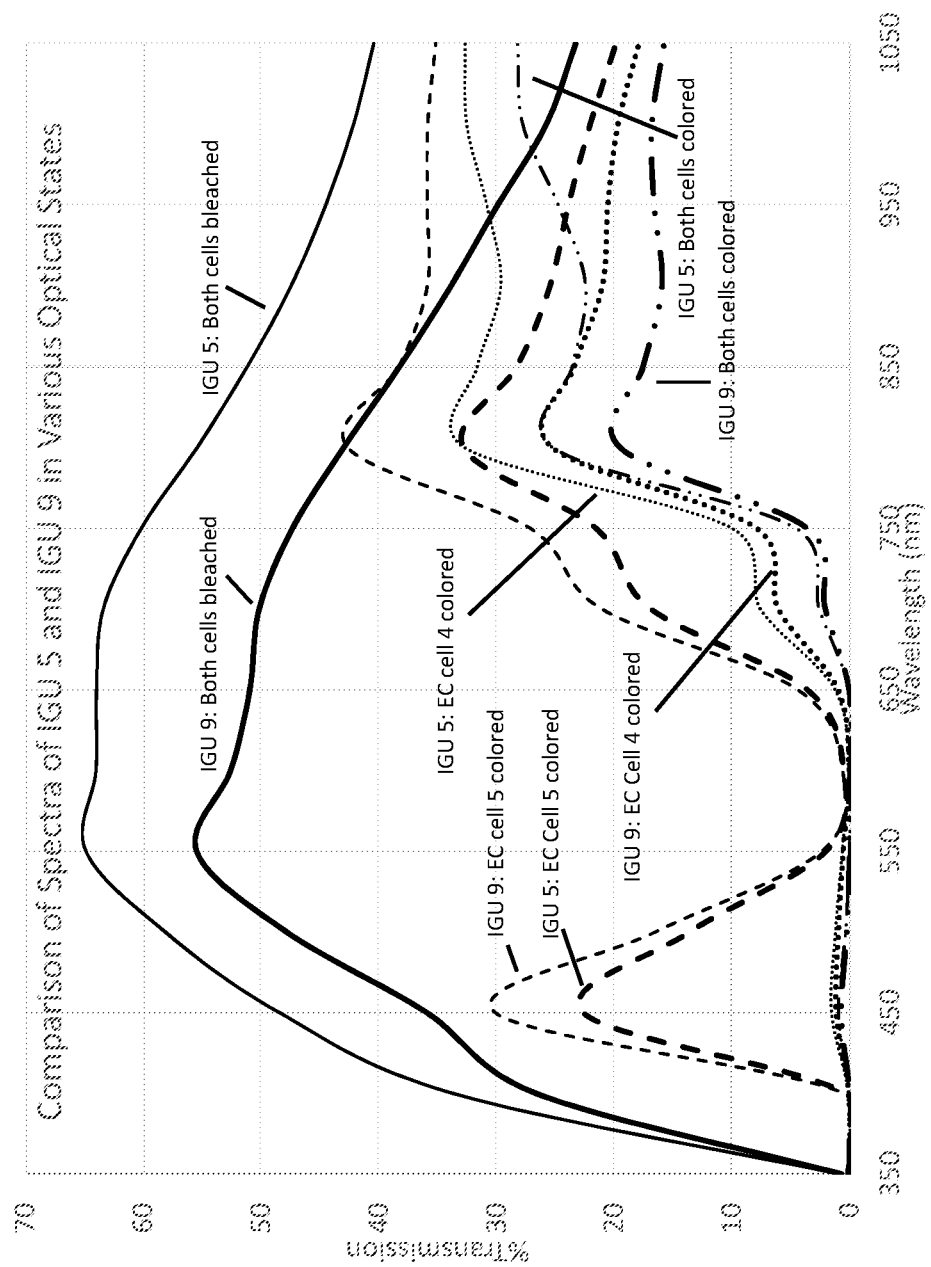
FIG. 11 compares the transmittance spectra of IGU 5 and IGU 9 in the different optical states (measurement mode was in transmission).
Figure 12:
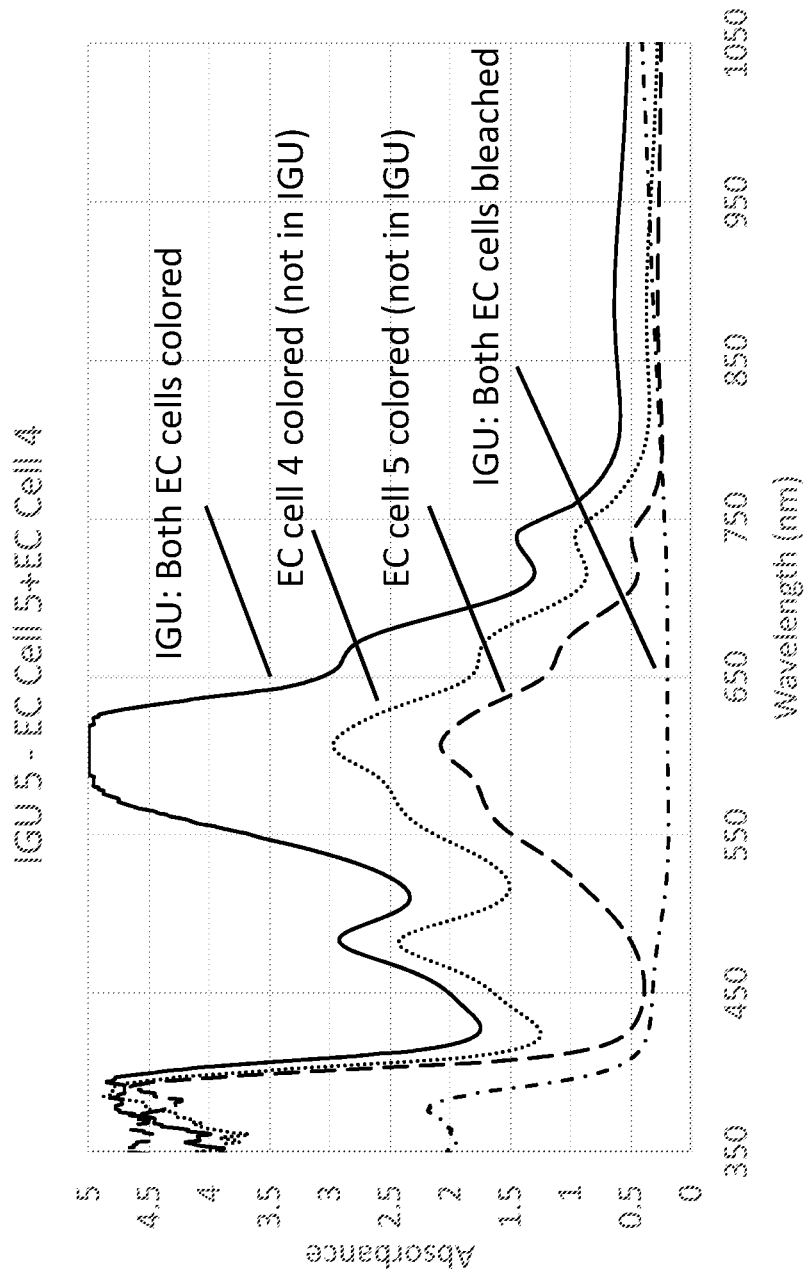
FIG. 12 shows the absorbance spectra and the EC cells of IGU 5 when measured in transmitting mode.

FIG. 11 shows and compares the optical properties of IGU 5 (Example 4) and IGU 9 (this Example), in both colored and bleached states. Both of these use two EC cells as the outer and the inner panels, i.e., in EC Cell 5 and EC Cell 4 respectively. The significant difference is that in IGU 9 an extra thin element (thin glass element coated with ITO) is introduced between the inner and the outer panels. The introduction of this decreases the transmission slightly at all wavelengths. All of the measurements in this example were made in the IGU configuration.

Example 6: IGUs Measured in Optical Absorbance Mode

Figure 13:
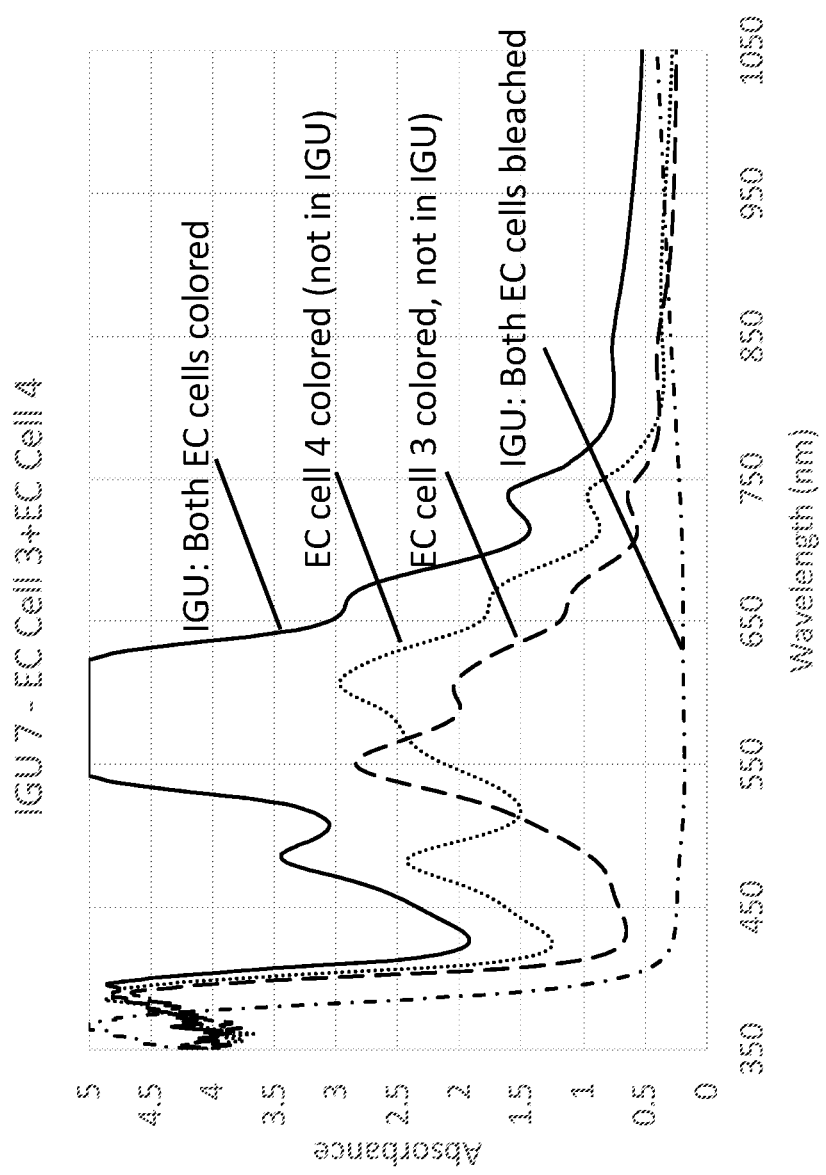
FIG. 13 shows the absorbance spectra and the EC cells of IGU 7 when measured in transmitting mode.
Figure 14:
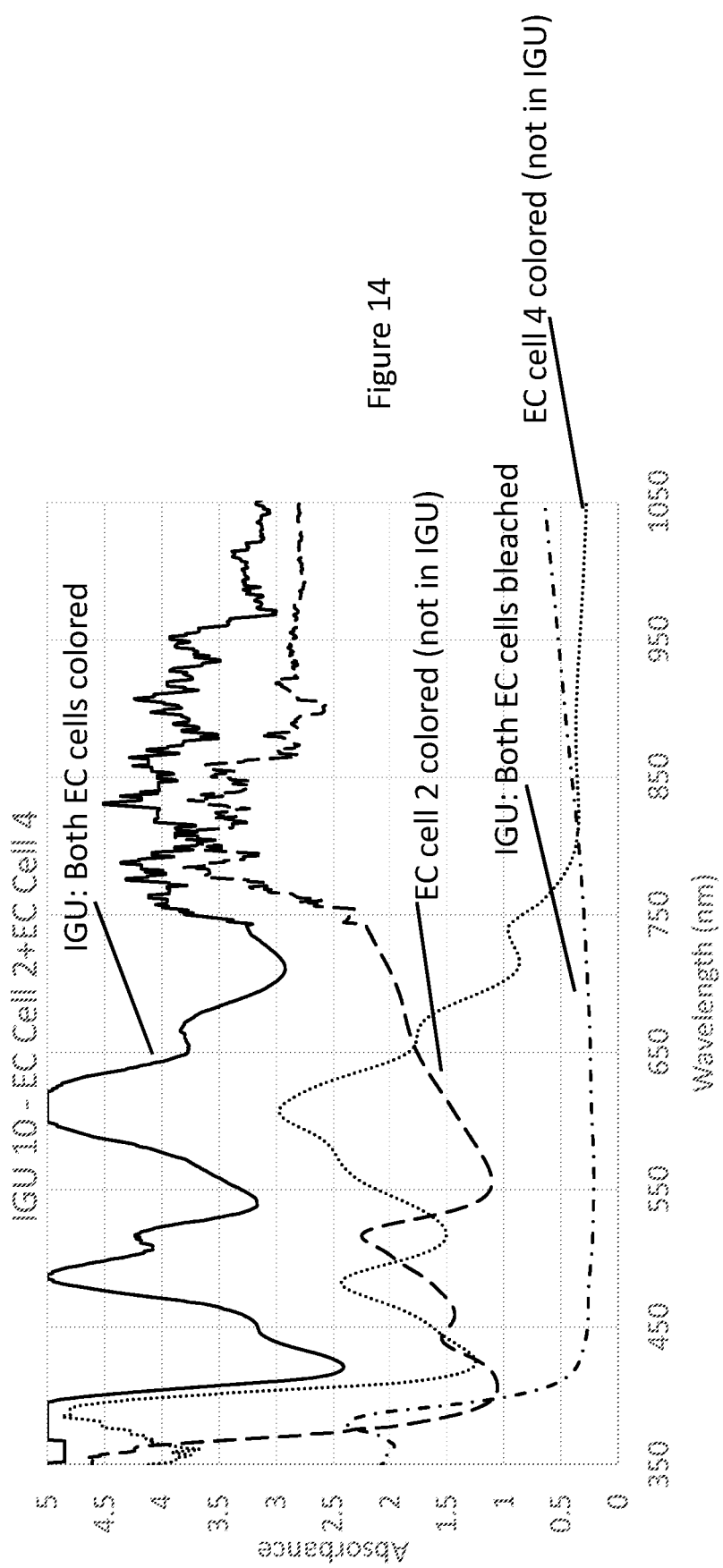
FIG. 14 shows the absorbance spectra and the EC cells of IGU 10 when measured in transmitting mode.

As seen in Example 4 (Table 5), some of the IGUs resulted in very low transmissions at 550 nm when both panels were colored. When such low transmissions are obtained, these may be inaccurate, and it is better to make these transmission measurements in optical absorbance mode on the spectrometer which is able to go to a higher absorbance. For this example for optical measurements, Shimadzu UV3100 spectrometer was used (instrument from Shimadzu Corporation, Columbia, MD). This spectrometer, was able to read up to an absorbance of 5. Table 7 below gives the details of the two EC panels used to form the IGU and also their optical absorbance at 550 nm. The wavelength of 550 nm is often used as that is close to the peak of the photopic response of the eye. The following three IGUs were made as described in Example 5 and evaluated in transmission by recording their optical absorbance. In this table the measurements of both the EC cells in colored and bleached states were made in an IGU configuration. The optical absorbance numbers shown for individual EC cells are provided for reference only, and these were measured for each cell by itself, when these were not a part of an IGU assembly. The same applies for the absorption spectra shown in FIGS. 13 to 15 for each of the IGUs, that correspond to Table 7.

TABLE 6

Optical properties in transmission of IGUs with thin glass (low-e coated) placed between the outer and the inner panels

| IGU Outer and Inner Panels | Optical State | % T at 550 nm | L* | a* | b* | c* | ΔE* |
|---|---|---|---|---|---|---|---|
| IGU 8: EC Cell 5 + Frosted Glass | Bleached | 53.5 | 76.4 | −5.3 | 14.3 | 15.2 | 75.0 |
| | Colored | 2.0 | 27.3 | −1.7 | −42.3 | 42.3 | |
| IGU 9: EC Cell 5 + EC Cell 4 | Both EC Cells Bleached | 55.46 | 77.3 | −5.4 | 16.9 | 17.7 | |
| | Both EC Cells Colored | 0.02 | 1.04 | 2.0 | −8.8 | 9.0 | 80.8 |
| | Only EC Cell 4 Colored | 0.55 | 6.86 | −6.7 | −7.9 | 10.3 | 74.7 |
| | Only EC Cell 5 colored | 2.02 | 27.3 | −2.3 | −41.7 | 41.8 | 77.1 |
| Optical Properties of thin glass with Low-e coating | | 84.6 | 92.7 | −4.0 | 6.1 | 7.3 | |

TABLE 7

IGUs measured in optical absorbance mode

| IGU- EC cells used | Optical state | Absorbance at 550 nm |
|---|---|---|
| IGU 5 EC cell 5 + EC Cell 4 | Both EC cells bleached (IGU) | 0.188 |
| | Both EC cells colored (IGU) | 3.645 |
| | Only cell 4 colored | 2.117 |
| | Only Cell 5 colored | 1.476 |
| IGU 7 EC cell 3 + EC Cell 4 | Both EC cells bleached (IGU) | 0.178 |
| | Both EC cells colored (IGU) | >5 |
| | Only cell 3 colored | 2.839 |
| | Only Cell 4 colored | 2.117 |
| IGU 10 EC cell 2 + EC Cell 4 | Both EC cells bleached (IGU) | 0.211 |
| | Both EC cells colored (IGU) | 3.308 |
| | Only cell 2 colored | 1.120 |
| | Only Cell 4 colored | 2.117 |

In Table 7, for IGU 7, when both cells are colored, its optical absorption is greater than 5, which means that its transmission will be lower than 0.001%. However, this number is 0.02% in Table 5 when measured in the transmission mode on the Hunterlab instrument (this transmission of 0.02% is equivalent to Absorbance=3.7). As another example for IGU 5 a transmission of 0.03% measured in Table 5 which corresponds to an absorbance of 3.52 and is closer to the value of 3.645 (% T equivalent to about 0.02%). Thus, when measuring very low transmissions one has to ensure that the instrument limits or the measurement mode limits are not reached. Although these low transmissions were measured in an IGU mode, this has more to do with two cells stacked together or laminated and coloring deep to different colors.

Example 7: Reduction in Reflection Color Change by Laminating a VLTP with Cover Glasses with Different Optical Properties EC cell 5 shown In Example 1 which colors from bleached to a dark blue state was selected for this example. Several such cells were made and laminated using 760 micron thick PVB film (Trosifol B500JR obtained from Kuraray America, Houston, TX) to different commercial cover glasses. The properties of these commercial glasses (all obtained from NSG) are listed in Table 8. Some of these glasses were tinted, and further some of them were coated with multiple layers to increase their reflection when observed from the non-coated side. The undercoat in these coated glasses generally comprise at least one layer, and these may be different for different cover glasses. All of these substrates were standard soda-lime glasses. The 6 mm thick clear glass are also included in the table for reference, but this was not used to form a lamination. Its properties are listed showing that this when used for lamination will have almost no impact on reflective color change when used instead of the 2.3 mm thick glass. Most of the glasses from this list were laminated to a VLTP and the color properties measured in reflection. The reflection data is shown in Table 9. In the laminate, the coated side faced the VLTP and was in contact with the polymeric layer.

TABLE 8

Properties of various cover glasses used for lamination to the VLTP

| Glass Type* | Thickness (mm) | Coatings sequence | Visible light transmission, % | % Transmission at 550 nm | Visible light reflection, % |
|---|---|---|---|---|---|
| Clear (uncoated) | 2.23 | None | 91 | 90 | 8.6 |
| Clear (uncoated) | 6 | None | 88 | 87 | 8.4 |
| EA Clear | 6 | Glass/Undercoat/$SnO_2$:F/$TiO_2$ | 67 | 66 | 25 |
| E Silver | 6 | Glass/Undercoat/$TiO_2$ | 63 | 63 | 34 |
| E Gold | 6 | Glass/Undercoat/$Fe_2O_3$ | 40 | 39 | 36 |
| Bronze (not coated) | 6 | None | 51 | 56 | 6 |
| EA Bronze | 6 | Glass/Undercoat/$SnO_2$:F/$TiO_2$ | 38 | 40 | 11 |
| Grey (not coated) | 6 | None | 44 | 47 | 5 |
| EA Grey | 6 | Glass/Undercoat/$SnO_2$:F/$TiO_2$ | 32 | 34 | 10 |
| Arctic Blue (not coated) | 6 | None | 54 | 57 | 6 |
| EA Arctic Blue | 6 | Glass/Undercoat/$SnO_2$:F/$TiO_2$ | 39 | 43 | 12 |

*E = Eclipse, EA = Eclipse Advantage, all coated and tinted glasses are from NSG, Toledo, OH Most of the glasses from this list were laminated to a VLTP and the color properties measured in reflection. In the laminate, the coated side faced the VLTP and was in contact with the polymeric layer. The reflection was measured from the cover-glass side. The VLTP laminated to the various glasses were measured in reflection for their color while in the bleached state and in their most colored state which was obtained by applying 1.3V across its terminals of the VLTP for 120 seconds at which time the color reached a saturation state. In all cases these measurements were made in two ways, one with white background placed behind the VLTP and the in the other case a black felt was placed behind the VLTP. The results of these measurements are in Table 9 and in FIG. 16.

TABLE 9

Comparison of reflected color properties of the VLTP laminated to various glass substrates as shown

| VLTP with* laminated | VLTP State | With White background | | | | | With Black Background | | | | |
|---|---|---|---|---|---|---|---|---|---|---|---|
| | | L* | a* | b* | c* | ΔE* (W) | L* | a* | b* | c* | ΔE* (B) |
| Not laminated | Bleached | 86.8 | −2.8 | 17.6 | 17.8 | 70.9 | 46.2 | 0.2 | 3.5 | 3.5 | 19.7 |
| | Colored | 36.4 | 6.0 | −31.5 | 32.0 | | 32.2 | 2.2 | −10.2 | 10.5 | |
| Clear (not coated glass) NCG | Bleached | 83.9 | −4.4 | 22.9 | 23.3 | 68.9 | 45.7 | −0.7 | 7.8 | 7.8 | 19.0 |
| | Colored | 36.1 | 3.4 | −26.1 | 26.3 | | 32.2 | 0.8 | −5.5 | 5.6 | |
| EA Clear | Bleached | 79.3 | −3.5 | 16.9 | 17.3 | 39.3 | 54.9 | −2.3 | 3.9 | 4.5 | 7.7 |
| | Colored | 50.3 | −0.6 | −9.5 | 9.5 | | 49.4 | −2.3 | −1.5 | 2.7 | |
| E Silver | Bleached | 84.9 | −4.7 | 7.2 | 8.6 | 33.7 | 65.0 | −4.5 | −2.4 | 5.1 | 7.5 |
| | Colored | 61.1 | −3.4 | −16.7 | 17.0 | | 60.1 | −4.5 | −8.2 | 9.3 | |
| Uncoated Gray | Bleached | 48.3 | −1.4 | 5.9 | 6.1 | 24.6 | 32.4 | 0.1 | 1.0 | 1.0 | 5.2 |
| | Colored | 29.0 | 2.2 | −8.9 | 9.2 | | 28.4 | 0.5 | −2.3 | 2.3 | |
| EA Gray | Bleached | 47.3 | −0.6 | 6.2 | 6.2 | 16.3 | 34.4 | −0.3 | 0.8 | 0.8 | 2.8 |
| | Colored | 35.1 | 1.1 | −4.5 | 4.6 | | 32.3 | −0.2 | −1.1 | 1.1 | |
| TEC Gray | Bleached | 53.5 | −1.3 | 10.0 | 10.0 | 30.1 | 34.9 | 0.0 | 1.3 | 1.3 | 6.4 |
| | Colored | 30.7 | 2.0 | −9.4 | 9.6 | | 30.1 | 0.5 | −3.0 | 3.0 | |
| EA Bronze | Bleached | 53.9 | 3.4 | 16.3 | 16.7 | 24.5 | 37.4 | 0.1 | 5.1 | 5.1 | 4.6 |
| | Colored | 37.3 | 0.4 | −1.4 | 1.5 | | 34.4 | −0.8 | 1.7 | 1.9 | |

TABLE 9-continued

Comparison of reflected color properties of the VLTP laminated to various glass substrates as shown

| VLTP with* laminated | VLTP State | With White background | | | | | With Black Background | | | | |
|---|---|---|---|---|---|---|---|---|---|---|---|
| | | L* | a* | b* | c* | ΔE* (W) | L* | a* | b* | c* | ΔE* (B) |
| E-Gold | Bleached | 73.9 | 9.5 | 45.3 | 46.3 | 21.4 | 59.0 | 4.4 | 31.0 | 31.4 | 3.1 |
| | colored | 61.3 | 4.2 | 28.8 | 29.1 | | 57.2 | 3.5 | 28.7 | 28.9 | |
| EA Artic Blue | Bleached | 54.9 | −12.9 | −1.1 | 13.0 | 23.7 | 40.0 | −5.2 | −4.7 | 7.0 | 4.4 |
| | colored | 37.5 | −1.8 | −12.9 | 13.0 | | 36.8 | −3.3 | −7.0 | 7.7 | |

*E is abbreviated for Eclipse and EA for Eclipse Advantage (all coated and tinted glasses are from NSG, Toledo, OH)

from NSG, Toledo, OH)

Figure 16:
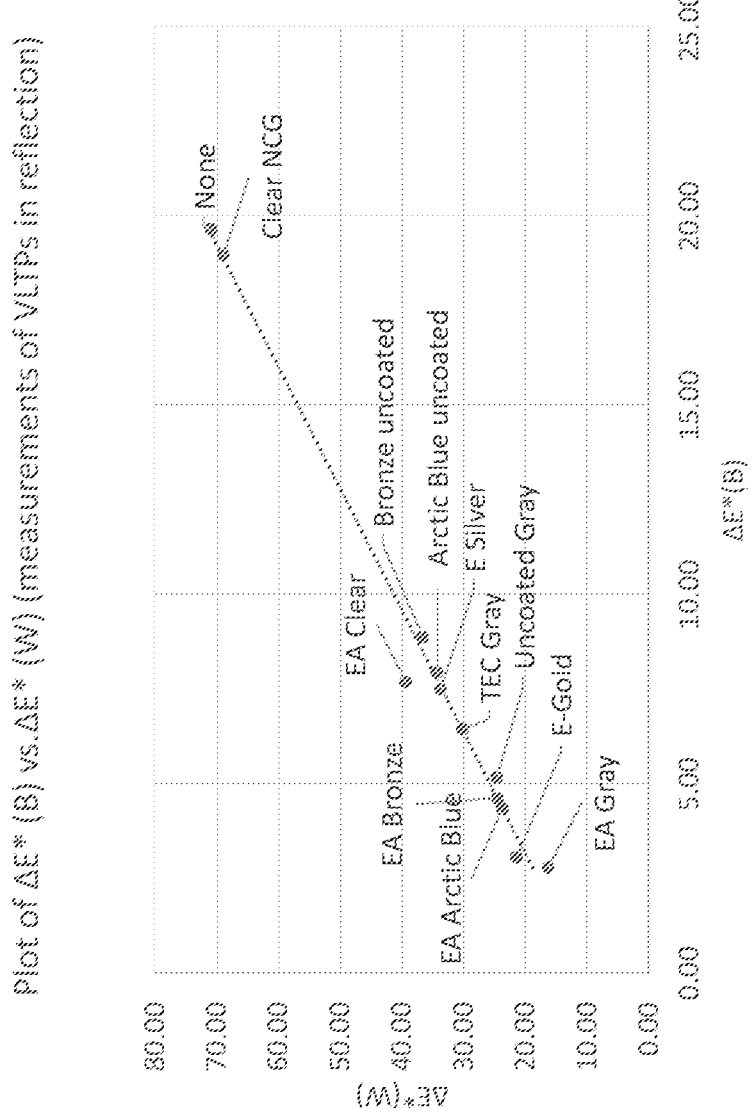
FIG. 16 shows color change in reflection for the VLTPs in the clear and the dark states with black and white backgrounds.

Data in Table 9 show that when this VLTP is measured in reflection, the color change seen in reflection between the colored and the bleached state with a white background (ΔE*(W)) is 70.9. This means that any object (e.g., a drape) that is lightly colored will result in a large color change when observed from the outside. This means if the windows have such drapes drawn, then from outside the windows during the day will appear highly checkered if some are in the colored state and the others are in the dark state. Windows without drapes may be closer to the black background, as the indoor intensity even if lit is far less as compared to the outdoor light under bright daylight. As also seen for this VLTP that is not laminated, the color change with black background (ΔE*(B)) for the same panel is 19.7. When this VLTP is laminated using clear film and clear glass (Glass NCG, clear non-coated glass), there is very little change in the reflected color change as the ΔE* numbers are 68.9 and 19 respectively for white and black background. The data in Table 9 are plotted in FIG. 16. This clearly shows that using tinted glass that is not coated (e.g., uncoated gray) or even clear glass coated with clear reflective coatings (e.g., EA clear) results in substantial reduction in color change (ΔE*). Some of the other glasses with deeper tints show even a higher reduction in ΔE*. Without going into the theory of color reduction, we aim in one embodiment is to select the cover glasses or the polymer films to have optical properties so as to decrease the color change by laminating a cover glass by 50% either when measured using white background or using a black background. FIG. 16 shows that the slope of the trendline (shown as the dotted straight line) is 0.32. This shows that the change in reflection measured using white background is much more. This also means that placing light colored drapes behind the VLTP will show the difference in color much more between the colored and the bleached state of the VLTP.

Although this has been shown using a VLTP that colors to deep blue, the same principles apply for any VLTP that colors to a darker state even if it is neutral color, this is because color difference ΔE* also includes L* value in its calculation. As an extreme example a a non-laminated VLTP coloring from clear to dark which is perfectly neutral, i.e., a* and b* being zero in both states will still show a ΔE* change of 50.4, if its L* values are as shown of 86.8 and 36.4 in the bleached and the colored states using white background.

Example 8: Reduction in Reflection Color Change in IGUs Made from VLTPs (EC Cell 5, Example 1) Laminated with Cover Glasses to Reduce Reflection Since in most applications VLTPs are not used for windows (unless used for indoor partitions in a building), but rather these are incorporated within the IGUs, it is more instructive to measure the color change within an IGU setting. This will be to some extent dependent on the construction of the IGU (e.g., air gap width, optical properties of the second panel, etc.), but here we can generalize the findings based on relative changes.

Some of the laminated VLTPs from Example 7 were assembled into IGUs using a glass substrate with a low-e coating. Please note in all cases, the VLTP used was EC cell 5 (Example 1). The low-e coated glass was a 3.2 mm thick TEC10 from NSG. This is a transparent non-colored soda-lime glass having a clear low-e coating. In window applications the low-e glass substrates are usually tempered or heat strengthened, but since the optical properties do not change with these processes, like in Example 6, annealed glass was used. These were made following the construction details in Example 6 with ⅜ inch air separation. For the VLTP, the laminated cover glass, when coated faced the PVB polymeric film as in Example 7. Table 10 shows the results of the reflected color of these IGUs (when observed from the laminated cover side) both in the bleached and the colored state and measuring ΔE* with both white and black backgrounds. This data is also plotted for both types of backgrounds in FIG. 17

TABLE 10

Comparison of reflected color properties of the IGUs with VLTP panels aminated to various cover glasses as shown

| Cover glass | VLTP State | With white Background | | | | | With Black Background | | | | |
|---|---|---|---|---|---|---|---|---|---|---|---|
| | | L* | a* | b* | c* | ΔE* | L* | a* | b* | c* | ΔAE* |
| None | Bleached | 66.0 | −1.76 | 13.8 | 13.9 | 44.0 | 50.2 | −0.5 | 7.7 | 7.7 | 23.7 |
| | colored | 33.2 | 3.81 | −15.0 | 15.5 | | 32.2 | 2.2 | −7.5 | 7.8 | |
| EA Clear | Bleached | 65.1 | −2.91 | 9.9 | 10.3 | 21.0 | 57.2 | −2.7 | 4.8 | 5.5 | 10.4 |
| | colored | 49.9 | −1.76 | −4.6 | 4.9 | | 49.6 | −2.2 | −2.2 | 3.1 | |
| Uncoated Gray | Bleached | 39.5 | −0.86 | 3.6 | 3.7 | 14.0 | 34.1 | −0.3 | 1.4 | 1.4 | 7.1 |
| | colored | 28.6 | 1.1 | −5.0 | 5.1 | | 28.4 | 0.6 | −2.9 | 3.0 | |

TABLE 10-continued

Comparison of reflected color properties of the IGUs with VLTP panels aminated to various cover glasses as shown

| Cover glass | VLTP State | With white Background | | | | | With Black Background | | | | |
|---|---|---|---|---|---|---|---|---|---|---|---|
| | | L* | a* | b* | c* | ΔE* | L* | a* | b* | c* | ΔΔE* |
| EA Gray | Bleached | 41.2 | −0.18 | 3.1 | 3.1 | 8.4 | 37.9 | 0.1 | 1.2 | 1.2 | 4.0 |
| | Colored | 35.1 | 0.66 | −2.6 | 2.6 | | 35.0 | 0.4 | −1.5 | 1.6 | |
| E-Gold | Bleached | 66.6 | 6.68 | 37.0 | 37.6 | 9.4 | 63.6 | 5.4 | 33.4 | 33.9 | 4.2 |
| | colored | 61.1 | 4.3 | 29.8 | 30.1 | | 61.1 | 4.3 | 30.3 | 30.6 | |

These data show that also in the IGU mode, there is a reduction in color change (that is reduction in ΔE*) when the VLTP is laminated with a glass that has certain optical properties. The glass resulting in reflective color reduction may be colored and not coated (e.g., Uncoated Gray), or a glass which is not colored and is coated (e.g., EA Clear and E Gold, in the latter the gold color is from the coatings) and also a glass that is both colored and coated (such as EA Gray). It is desirable to use these glasses as laminated covers for the VLTP panels in an IGU, so that the change in ΔE* can be reduced when the VLTP changes color from bleached to the dark (or colored) state. This color reduction between the two states for the IGU should be by at least 50% as compared to a non-laminated VLTP. In another embodiment this reduction should be 65% as demonstrated by the use of uncoated Gray, EA Gray and Gold in Table 10.

These data (See FIG. 17—Data taken from both Tables 9 and 10) also show that a reduction in reflected color change in a VLTP can be almost linearly correlated to the change in the reflected color in an IGU, but the extent of the ΔE* is higher when observed for the VLTP alone as compared to the same VLTP when it is present in an IGU. When using white background, the IGU showed an average reduction in ΔE* of about 55% compared to the VLTPs. However, when the same is done for the black background there is about a 29% average increase in ΔE* for the IGUs when compared to the same VLTPs.

As can also be seen from Table 10 and FIG. 17, that by selecting the appropriate tint and/or using a reflective coating stack for the cover glass used for lamination, the ΔE* value difference when measured in an IGU configuration, between the colored and the bleached states of the VLTP can be substantially reduced to 25 or below using white background, and below 10 using black background. As a comparison, when these VLTPs are integrated in an IGU without lamination described above, then the change in color for the IGU in reflection is large (44 in this case) against a white background. Against the black background without lamination, the change in color is also large (23.7 in this case). This data shows that in most desirable cases, the lamination using certain types of glasses and/or polymeric films can substantially reduce these reflective color changes to less than 25 (or less than 20 in another embodiment) against a white background; and a large reduction is also obtained against a black background of less than 10 (or in another embodiment of less than 8). Please note that different measures are used for indicating a large color change for white and the black backgrounds.

Table 11 shows the transmission data for the same IGUs that are used in Table 10. In addition, this also provides data on the VLTPs prior to their incorporation into the IGUs. This table shows that the transmitted color difference (or color difference in transmission in going from the bleached to the colored state) is large for each case, either when measured as VLTP or when the VLTP is present in an IGU.

TABLE 11

Comparison of transmitted color properties of the VLTP panels with and without laminated cover glasses and the IGUs formed using the same VLTP panels

| Cover glass | VLTP State | % T 550 nm | L* | a* | b* | c* | ΔE* |
|---|---|---|---|---|---|---|---|
| | | For VLTP | | | | | |
| None | Bleached | 79.5 | 90.5 | −1.95 | 10.2 | 10.4 | 84.8 |
| | colored | 3.0 | 34.4 | 3.38 | −53.3 | 53.4 | |
| EA Clear | Bleached | 64.3 | 83.2 | −2.19 | 13.7 | 13.8 | 78.9 |
| | colored | 2.7 | 31.7 | −1.81 | −46.2 | 46.2 | |
| Uncoated Gray | Bleached | 40.7 | 67.1 | −1.56 | 5.8 | 6.0 | 67.1 |
| | colored | 1.14 | 22.7 | 5.71 | −43.9 | 44.3 | |
| EA Gray | Bleached | 32.6 | 61.4 | −1.02 | 8.3 | 8.3 | |
| | Colored | 1.45 | 21.3 | 1.84 | −37.9 | 37.9 | |
| E-Gold | Bleached | 40.2 | 69.3 | 4.5 | 35.4 | 35.7 | 74.8 |
| | colored | 2.56 | 25.6 | −14.3 | −22.4 | 26.6 | |
| | | For IGU | | | | | |
| None | Bleached | 67.0 | 84.4 | −2.13 | 11.8 | 12.0 | 80.7 |
| | colored | 2.5 | 31.3 | 1.45 | −48.9 | 48.9 | |
| EA Clear | Bleached | 54.4 | 77.6 | −2.57 | 15.1 | 15.3 | 75.6 |
| | colored | 2.2 | 28.5 | −2.71 | −42.4 | 42.4 | |
| Uncoated Gray | Bleached | 34.1 | 62.2 | −1.93 | 7.4 | 7.6 | 63.6 |
| | colored | 1.1 | 20.3 | 3.75 | −40.1 | 40.3 | |

TABLE 11-continued

Comparison of transmitted color properties of the VLTP panels with and without laminated cover glasses and the IGUs formed using the same VLTP panels

| Cover glass | VLTP State | % T 550 nm | L* | a* | b* | c* | ΔE* |
|---|---|---|---|---|---|---|---|
| EA Gray | Bleached | 27.6 | 57.1 | −1.38 | 9.7 | 9.8 | 58.1 |
|  | Colored | 1.2 | 19.3 | −0.3 | −34.4 | 34.4 |  |
| E-Gold | Bleached | 33.8 | 64.4 | 4.21 | 34.9 | 35.2 | 73.0 |
|  | colored | 1.7 | 21.0 | −11.5 | −21.7 | 24.5 |  |

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 0.01 to 2.0" should be interpreted to include not only the explicitly recited values of about 0.01 to about 2.0, but also include individual values and sub-ranges within the indicated range. Thus, included in this numerical range are individual values such as 0.5, 0.7, and 1.5, and sub-ranges such as from 0.5 to 1.7, 0.7 to 1.5, and from 1.0 to 1.5, etc. Furthermore, such an interpretation should apply regardless of the breadth of the range or the characteristics being described. Additionally, it is noted that all percentages are in weight, unless specified otherwise.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. For example, in one aspect, the degree of flexibility can be within about +10% of the numerical value. In another aspect, the degree of flexibility can be within about +5% of the numerical value. In a further aspect, the degree of flexibility can be within about +2%, +1%, or +0.05%, of the numerical value. Numerical quantities given are approximate, meaning that the term "around," "about" or "approximately" can be inferred if not expressly stated.

The discussion, description, examples and embodiments presented within this disclosure are provided for clarity and understanding. A variety of materials and configurations are presented, but there are a variety of methods, configurations and materials that may be used to produce the same results. While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations are not intended to convey that the claimed subject matter requires features or combinations of features other than those expressly recited in the claims. Accordingly, the scope of this disclosure is intended to include all modifications and variations encompassed within the spirit and scope of the following appended claims.

The invention claimed is:

1. A building entryway system containing at least one variable light transmission panel (VLTP), wherein the VLTP is used in at least one of a doorlite, a sidelite, and a transom of the building entryway system, and wherein the VLTP is configured to change optical transmission and color from a clear state to a colored state upon application of an electric voltage thereto, wherein the clear state and the colored state in transmission have a color difference ΔE* equal to or greater than 35 and configured such that said application of voltage does not change opacity of the VLTP by changing haze, wherein each of the at least one of a doorlite, a sidelite, and a transom comprises either (a) more than one VLTP or (b) the VLTP is divided into two or more sections.

2. The building entryway system of claim 1, wherein the VLTP is an electrochromic element.

3. The building entryway system of claim 1, wherein the VLTP comprises another panel as an insulated glazing unit assembled thereon.

4. The building entryway system of claim 1, wherein the VLTP is configured to receive electric voltage through an electronic module or a control system wherein this electronic module or the control system is connected to at least one additional electronic device in the building entryway system that is not the VLTP.

5. The building entryway system of claim 4, wherein the additional electronic device is selected from at least one of electronic lock, a doorbell camera, a display, an optical indicator, a light sensor, a doorbell chime, an audible indicator, an audible alarm, a smoke alarm, a burglar alarm, a video interface, a thermometer, a humidity sensor, a wind sensor, a door open/shut sensor, a burglar or intruder detection sensor, a panic button, lights, a motion sensor, a camera, a speaker, an audible noise generator, third party activation, or a combination thereof.

6. The building entryway system of claim 5, wherein the building entryway system partitions a first space located outside a building and a second space located inside the building, wherein the first space has an illumination level of $L_1$ in lux and the second space has an illumination level of $L_2$ in lux, and wherein the building entryway system is configured such that a privacy, P, of the first space through the VLTP from the second space is controlled by the control system adjusting the illumination between the two spaces relative to each other by changing light intensity of one or more connected lights and the visible transmission of the VLTP, such that a value of P≥5 according to $P=(R \times L_2)/(T \times L_1)$, where R is visible reflectivity in percentage of the VLTP in the second space, and T is visible transmission in percentage of the VLTP.

7. The building entryway system of claim 1, further comprising a movable element in which the VLTP is located, wherein the movable element is configured to be pivotable between a closed position and an open position, and configured such that the electric voltage is connected to the VLTP when the movable element is in the closed position and the electric voltage is disconnected from the VLTP when the movable element is in the open position.

8. The building entryway system of claim 1, wherein the VLTP is integrated into an IGU by combining the VLTP with a second panel, wherein the VLTP and the second panel are in a parallel configuration separated by a gap containing a gas or the gap is evacuated.

9. The building entryway system of claim 8, wherein the R value in a center of the doorlite, sidelite, or transom is equal to or greater than 3 (° F.-ft$^2$-hour)/Btu.

10. The building entryway system of claim 8, wherein the second panel is glass coated with a low-e coating.

11. The building entryway system of claim 8, wherein the second panel is frosted glass.

12. The building entryway system of claim 1, comprising a door panel comprising non-glass elements, wherein the R value of the door panel is equal to or greater than 3 (° F.-ft$^2$-hour)/Btu.

13. The building entryway system of claim 1, further comprising a rechargeable battery, a super-capacitor, a solar panel, or a combination thereof.

14. The building entryway system of claim 8, wherein the second glass panel is a second VLTP, and the said VLTP and the second VLTP are configured to be darkened independently of each other from their clear states and have a property such that each panel darkens to a different color in their colored state, and the VLTP and the second VLTP have a color difference in the colored state in transmission characterized by:
  (a) a color difference $\Delta E^*$ between these panels is $\geq 25$; and
  (b) at least one of the following of the two color difference conditions also applies:
    (i) at least one of a* and b* values of these panels have different polarity from each other; and
    (ii) at least one of the a* or the b* values of these panels are different by at least 20 points.

15. The building entryway system of claim 8, wherein the VLTP and the second VLTP, when in the colored state, impart an optical absorbance to the IGU of equal to or greater than 4 in at least 100 nm wavelength range within the visible region from 400 to 700 nm.

16. The building entryway system of claim 8, wherein the second panel is a VLTP.

17. A window system of a building entryway system, the window system comprising a control system and at least one VLTP that partitions a first space located outside a building and a second space located inside the building, wherein the first space has an illumination level of $L_1$ in lux and the second space has an illumination level of $L_2$ in lux, and wherein the window is configured such that a privacy, P, of the first space through the VLTP from the second space is controlled by the control system which adjusts illumination output of lights located in at least one of the first space and the second space to vary relative illumination between the first space and the second space relative to each other and also adjusts visible transmission of the VLTP to have a value of P$\geq$5 according to $P=(R \times L_2)/(T \times L_1)$, where R is visible reflectivity in percentage of the VLTP in the second space, and T is visible transmission in percentage of the VLTP.

18. The window system of claim 17, wherein, at night, the control system is configured to automatically control the visible transmission of the VLTP and relative illumination between the first space and the second space.

19. The window system of claim 18, wherein the control system is configured to communicate with at least one light sensor and a light source to control relative illumination level between the first space and the second space.

20. A building window system containing at least two variable light transmission panels (VLTPs) assembled in a parallel configuration, wherein at least two VLTPs are configured to be darkened independently of each other from their respective clear states and wherein these two VLTPs darken to a different color in their colored state, and wherein the color difference between a first VLTP and a second VLTP in the colored state in transmission is characterized by:
  (a) a color difference $\Delta E^*$ between these panels is $\geq 25$; and
  (b) at least one of the following of the two color difference conditions also applies:
    (i) at least one of a* and b* values of these panels have different polarity from each other; and
    (ii) at least one of the a* or the b* values of these panels must be different by at least 20 points.

21. The building window system as in claim 20, wherein the at least two VLTPs are combined in at least one of the following ways (a) by laminating them together using a polymeric interlayer and (b) combining them in an IGU as separate panels separated by a gap.

22. A building entryway system comprising the building window system of claim 20 as a doorlite, a sidelite, or a transom.

23. The building window system of claim 20, wherein the at least two VLTPs, when in the colored state, impart an optical absorbance to the window of equal to or greater than 4 in at least 100 nm wavelength range within the visible region from 400 to 700 nm.

24. The building window system of claim 21, wherein two laminated VLTPs are assembled in an IGU configuration with another panel with a gap in between the two laminated VLTPs and the another panel.

25. The building window as in claim 21, wherein an additional glass coated with a low-e coating is placed in the gap of the IGU.

26. A building entryway system containing at least one variable light transmission panel (VLTP), wherein the VLTP is in at least one of a sidelite and a transom of the building entryway system, and wherein the VLTP is configured to change optical transmission from a clear state to a colored state upon application of an electric voltage thereto, wherein, in transmission, the clear state and the colored state have a color difference $\Delta E^*$ equal to or greater than 35 and the application of the electric voltage does not change the opacity of the VLTP by changing haze.

27. The building entryway system of claim 26, wherein the VLTP is configured to receive the electric voltage through an electronic module or a control system wherein the electronic module or the control system is connected to at least one additional electronic device in the building entryway system that is not the VLTP.

* * * * *